United States Patent
Chang et al.

(10) Patent No.: US 12,185,243 B2
(45) Date of Patent: Dec. 31, 2024

(54) METHOD, COMMUNICATIONS DEVICE, AND NETWORK DEVICE FOR MONITORING PHYSICAL DOWNLINK CONTROL CHANNEL, COMMUNICATIONS DEVICE, AND NETWORK DEVICE USING WAKE-UP SIGNAL (WUS)

(71) Applicant: Huawei Technologies Co., Ltd., Shenzhen (CN)

(72) Inventors: Junren Chang, Beijing (CN); Shulan Feng, Beijing (CN); Xi Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 515 days.

(21) Appl. No.: 17/200,200

(22) Filed: Mar. 12, 2021

(65) Prior Publication Data

US 2021/0204214 A1   Jul. 1, 2021

Related U.S. Application Data

(63) Continuation of application No. PCT/CN2019/104541, filed on Sep. 5, 2019.

(30) Foreign Application Priority Data

Sep. 14, 2018   (CN) .......................... 201811076657.0

(51) Int. Cl.
*H04W 52/02* (2009.01)
*H04W 72/0453* (2023.01)
(Continued)

(52) U.S. Cl.
CPC .... *H04W 52/0229* (2013.01); *H04W 72/0453* (2013.01); *H04W 72/1263* (2013.01); *H04W 72/23* (2023.01)

(58) Field of Classification Search
CPC ......... H04W 52/0229; H04W 72/0453; H04W 72/1263; H04W 72/23; H04W 52/0216;
(Continued)

(56) References Cited

U.S. PATENT DOCUMENTS 10,588,171 B2 * 3/2020 Ang et al. ............. H04W 76/28
10,999,870 B2 * 5/2021 Ou et al. ........... H04W 74/0833
(Continued)

FOREIGN PATENT DOCUMENTS

CN      104684050 A    6/2015
CN      108024319 A    5/2018
(Continued)

OTHER PUBLICATIONS

Jiang et al.: DRX Parameter Indication Method, Related Device and System; WO 2019015458 A1 (Year: 2019).*
(Continued)

*Primary Examiner* — Meless N Zewdu
(74) *Attorney, Agent, or Firm* — Slater Matsil, LLP

(57) ABSTRACT

A method for monitoring a physical downlink control channel, a communications device, and a network device, the method including monitoring, by a communications device based on the wake-up signal and at least one bandwidth part (BWP), at least one physical downlink control channel, wherein the at least one BWP corresponds to the wake-up signal, and the at least one physical downlink control channel is a physical downlink control channel of at least one BWP indicated by the at least one wake-up signal.

15 Claims, 8 Drawing Sheets

(51) Int. Cl.
    *H04W 72/1263*   (2023.01)
    *H04W 72/23*     (2023.01)
(58) Field of Classification Search
    CPC ......... H04W 52/0219; H04W 52/0235; H04W
              76/28; H04W 52/02; H04W 52/00; H04W
              52/0225; H04W 52/0261; H04W 52/0283;
              H04W 52/143; H04W 72/0473; H04W
              52/0277; H04W 52/028; H04W 52/386;
              H04L 5/0098; H04L 5/00; H04L 67/143;
              H04L 67/145; G06K 19/0705; G06K
              15/4055; G06F 1/32; G06F 1/3203; G06F
              1/3206; G06F 1/3212
    See application file for complete search history.

(56)                  References Cited

U.S. PATENT DOCUMENTS

| | | | | |
|---|---|---|---|---|
| 11,128,419 | B2* | 9/2021 | Yoon et al. | ........... H04L 5/0048 |
| 2018/0103431 | A1* | 4/2018 | Suh et al. | ......... H04W 52/0235 |
| 2018/0270756 | A1* | 9/2018 | Bhattad et al. | ... H04W 52/0225 |
| 2019/0053029 | A1* | 2/2019 | Agiwal et al. | ......... H04W 4/90 |
| 2019/0090299 | A1* | 3/2019 | Ang et al. | ............. H04W 76/28 |
| 2019/0349815 | A1* | 11/2019 | Tiirola et al. | ......... H04W 28/20 |
| 2020/0053649 | A1 | 2/2020 | Yao et al. | |

FOREIGN PATENT DOCUMENTS

| | | | | |
|---|---|---|---|---|
| CN | 110167128 | A | 8/2019 | |
| WO | 2013110372 | A1 | 8/2013 | |
| WO | 2017052596 | A1 | 3/2017 | |
| WO | WO 2020008635 | A1 * | 1/2020 | ............ H04W 52/02 |
| WO | WO 2020038546 | A1 * | 2/2020 | ............ H04W 52/02 |

OTHER PUBLICATIONS

Li, Yan-hua: Portions of Bandwidth Switching Method and Device; CN 109496454 A (Year: 2019).*
Takeda et al.: User Terminal and Wireless Communication Method; WO 2020008635 A1 (Year: 2020).*
Karjalainen : Multi-Purpose Wake-Up Signal in New Radio; WO 2020038546 A1 (Year: 2020).*
Li, Jian-hui (CN 110351854 A) >>> Configuration Information Indication Method and Communication Device (see title). (Year: 2019).*
Oleksandr (WO 2019238241 A1) >>> Client Device and Network Access Node for Increased Power Efficiency (see title). (Year: 2019).*
Zhou (CN 110831121 A) >>> Collision Solving Method and Device Wake-up Signal, Storage Medium, Terminal and Base Station (see title). (Year: 2020).*
(CN 110839214 A) >>> Configuration Method Wake-up Transmitting Resource Position Signal, Wake Up Method and Device Thereof (see title) (Year: 2020).*
(CN 110839214 A), Gao et al.—Configuration Method Wake-up Transmitting Resource Position Signal, Wake Up Method And Device Thereof (see title) (Year: 2020).*
CN 114598360 B, Zhang et al.,—Information Transmission Method, Monitoring Method, Device, Base Station, Terminal And Storage Medium (see title) (Year: 2024).*
CN 112314023 A, Wu et al.,—Method And Apparatus For Signal Transmission And Reception (see title) (Year: 2021).*
(CN 110073697 B), Wilhelmsson et al., Wake-up Signal Structure (see title) (Year: 2022).*
Panasonic, "Interaction between BWP operation and C-DRX", 3GPP TSG-RAN WG2 Meeting #101, R2-1803182 (Revision of R2-1800976), Athens, Greece, Feb. 26-Mar. 2, 2018, 2 pages.
"3rd Generation Partnership Project; Technical Specification Group Radio Access Network; NR; Physical layer procedures for control (Release 15)," 3GPP TS 38.213 V15.2.0, Jun. 2018, 99 pages.
"3rd Generation Partnership Project; Technical Specification Group Radio Access Network; NR; Medium Access Control (MAC) protocol specification (Release 15)," 3GPP TS 38.321 V15.2.0, Jun. 2018, 73 pages.
"3rd Generation Partnership Project; Technical Specification Group Radio Access Network; NR; Radio Resource Control (RRC) protocol specification (Release 15)," 3GPP TS 38.331 V15.2.1, Jun. 2018, 303 pages.
"Remaining Details on Wake-up Signal Functions for feNB-IoT," Source: vivo, Agenda Item: 6.2.6.1.1.1, Document for: Discussion and decision, 3GPP TSG RAN WG1 Meeting #91, R1-1719755, Reno, USA, Nov. 27-Dec. 1, 2017, 5 pages.
"BWP of Size Zero for UE Power Saving," Source: Apple Inc., Document for: Discussion, Decision, 3GPP TSG-RAN WG1 #91, R1-1720546, Reno, US, Nov. 27-Dec. 1, 2017, 6 pages.
"Potential Enhancements to NR DL Signals and Channels for Unlicensed Operation," Agenda Item: 7.6.3.1, Source: Intel Corporation, Document for: Discussion/Decision, 3GPP TSG RAN WG1 Meeting #93, R1-1806542, Busan, Korea, May 21-25, 2018, 5 pages.
"Views on UE Power Saving," Agenda item: 7.2.8, Source: Qualcomm Incorporated, Document for: Discussion and Decision, 3GPP TSG RAN WG1 Meeting #94, R1-1809462, Gothenburg, Sweden, Aug. 20-24, 2018, 11 pages.
"Wake-Up Signaling for C-DRX ," Agenda item: 10.3.1.10, Source: Qualcomm Incorporated, Document for: Discussion/Decision, 3GPP TSG RAN WG2 RAN2#100, R2-1713803, Resubmission of R2-1711702, Reno, USA, Nov. 27-Dec. 1, 2017, 5 pages.
"DRX with Short onDuration and Wake-up Signaling," Agenda Item: 10.3.1.10, Source: Ericsson, Document for: Discussion, Decision, 33GPP TSG-RAN WG2 #101, R2-1803189, Update of R2-1800332, Athens, Greece, Feb. 26-Mar. 2, 2018, 3 pages.
"New SID: Study on UE Power Saving in NR," Source: CATT, CMCC, vivo, CATR, Qualcomm, MediaTek, Document for: Approval, Agenda Item: 9.1.8, 3GPP TSG RAN Meetings #80, RP-181463, La Jolla, USA, Jun. 11-14, 2018, 5 pages.

* cited by examiner

METHOD, COMMUNICATIONS DEVICE, AND NETWORK DEVICE FOR MONITORING PHYSICAL DOWNLINK CONTROL CHANNEL, COMMUNICATIONS DEVICE, AND NETWORK DEVICE USING WAKE-UP SIGNAL (WUS)

CROSS-REFERENCE TO RELATED APPLICATIONS

This application is a continuation of International Application No. PCT/CN2019/104541, filed on Sep. 5, 2019, which claims priority to Chinese Patent Application No. 201811076657.0, filed on Sep. 14, 2018. The disclosures of the aforementioned applications are hereby incorporated by reference in their entireties.

TECHNICAL FIELD

This application relates to the communications field, and more specifically, to a method for monitoring a physical downlink control channel, a communications device, and a network device.

BACKGROUND

Introduction of a wake-up signal (WUS) provides a method for a communications device to adaptively monitor a physical downlink control channel (PDCCH) according to a service arrival status. A network device sends the WUS to the communications device before a wake-up period (On-Duration) of a discontinuous reception (DRX) cycle, to wake up the communications device, so that the communications device normally monitors the PDCCH in corresponding on-duration. If the network device determines that the communications device has no scheduling in the DRX cycle, the network device does not send the WUS to the communications device before the DRX cycle, so that the communications device does not monitor the PDCCH in the corresponding on-duration.

To reduce monitoring of a redundant PDCCH when the communications device configures carrier aggregation (CA), the WUS is combined with the CA in the prior art. However, a control relationship is excessively monotonous when the WUS is used to indicate to monitor a PDCCH on each active component carrier (CC). In addition, a scenario in which a plurality of bandwidth parts (BWP) are simultaneously activated in one CC is not considered. Therefore, how to indicate an active BWP in each CC more flexibly and efficiently by using the WUS becomes an urgent problem to be resolved.

SUMMARY

This application provides a method for monitoring a physical downlink control channel, a communications device, and a network device, to more flexibly and efficiently indicate, by using a wake-up signal (WUS), to monitor each active component carrier and a physical downlink control channel of an active bandwidth part (BWP) in a component carrier, thereby reducing power consumption of the communications device.

According to a first aspect, a method for monitoring a physical downlink control channel is provided. The method includes the following.

A communications device detects at least one wake-up signal.

The communications device determines, based on the at least one wake-up signal, to monitor at least one physical downlink control channel, where the at least one physical downlink control channel is a physical downlink control channel of at least one bandwidth part (BWP) indicated by the at least one wake-up signal.

In this embodiment of this application, the communications device detects the at least one wake-up signal, to determine to monitor the physical downlink control channel of the bandwidth part (BWP) corresponding to the at least one wake-up signal, thereby reducing monitoring of a redundant PDCCH and reducing power consumption of the communications device.

It should be noted that in this embodiment of this application, a correspondence between the wake-up signal and the bandwidth part may be that one wake-up signal corresponds to one bandwidth part (BWP), or one wake-up signal corresponds to a plurality of bandwidth parts BWP, or a plurality of wake-up signals correspond to a plurality of bandwidth parts BWP.

With reference to the first aspect, in some implementations of the first aspect, the determining, by the communications device based on the at least one wake-up signal, to monitor at least one physical downlink control channel includes the following.

The communications device determines, based on the at least one wake-up signal and a mapping relationship, to monitor the at least one physical downlink control channel, where the mapping relationship indicates a correspondence between the at least one wake-up signal and the at least one bandwidth part (BWP).

In this embodiment of this application, the communications device may determine, based on the at least one wake-up signal and the mapping relationship, to monitor the at least one physical downlink control channel, thereby reducing monitoring of a redundant PDCCH and reducing power consumption of the communications device.

It should be understood that in this embodiment of this application, the mapping relationship may indicate the correspondence between the at least one wake-up signal and the at least one bandwidth part (BWP). The mapping relationship may also indicate a correspondence between the at least one wake-up signal and at least one component carrier.

With reference to the first aspect, in some implementations of the first aspect, the method further includes the following.

The communications device obtains the mapping relationship configured by a network device.

Optionally, in this embodiment of this application, the mapping relationship may be configured by the network device, and the network device sends the mapping relationship to the communications device.

Optionally, in this embodiment of this application, the mapping relationship may be a rule preset by the communications device and the network device.

With reference to the first aspect, in some implementations of the first aspect, the at least one wake-up signal includes a first wake-up signal, the mapping relationship includes a first mapping relationship, the first mapping relationship indicates a correspondence between the first wake-up signal and the at least one bandwidth part (BWP), and the determining, by the communications device based on the at least one wake-up signal, to monitor the at least one physical downlink control channel includes the following.

The communications device determines, based on the first wake-up signal and the first mapping relationship, to monitor the at least one physical downlink control channel.

In this embodiment of this application, the communications device may determine, based on the first wake-up signal in the at least one wake-up signal and the first mapping relationship, to monitor a physical downlink control channel of one or more bandwidth parts BWP corresponding to the first wake-up signal.

It should be understood that the first wake-up signal may be any one of the at least one wake-up signal.

With reference to the first aspect, in some implementations of the first aspect, when one component carrier has one active bandwidth part (BWP), the first mapping relationship indicates a correspondence between the first wake-up signal and at least one component carrier.

Alternatively, when one active component carrier has at least two active bandwidth parts BWP, the first mapping relationship indicates a correspondence between the first wake-up signal, at least one component carrier, and a bandwidth part (BWP) in the at least one component carrier.

Alternatively, when one active component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

Optionally, the at least one component carrier is an active component carrier, and the at least one bandwidth part (BWP) is an active bandwidth part.

Optionally, the communications device determines, based on the at least one wake-up signal, to monitor the at least one physical downlink control channel, and the physical downlink control channel is a physical downlink control channel of the at least one component carrier indicated by the at least one wake-up signal.

For example, when one component carrier has one active bandwidth part (BWP), the communications device determines, based on the first wake-up signal and the first mapping relationship, a physical downlink control channel of a component carrier corresponding to the first wake-up signal.

With reference to the first aspect, in some implementations of the first aspect, the mapping relationship includes a second mapping relationship, the second mapping relationship indicates a correspondence between a bit group corresponding to the at least one wake-up signal and the at least one bandwidth part (BWP), and the determining, by the communications device based on the at least one wake-up signal, to monitor the at least one physical downlink control channel includes the following.

The communications device generates the bit group corresponding to the at least one wake-up signal.

The communications device determines, based on the bit group and the second mapping relationship, to monitor the at least one physical downlink control channel.

It should be understood that when the communications device detects a plurality of wake-up signals, the communications device may generate, based on the plurality of wake-up signals, bit groups corresponding to the plurality of wake-up signals, and determine, based on the bit groups, to monitor physical downlink control channels of a plurality of bandwidth parts BWP. In other words, the determining, by the communications device based on the at least one wake-up signal, to monitor the at least one physical downlink control channel includes determining, based on a plurality of wake-up signals, to monitor a plurality of physical downlink control channels.

For example, it may be determined, through bit groups corresponding to M wake-up signals, to monitor M physical downlink control channels, where M is a positive integer greater than 1.

For example, it may be determined, through bit groups corresponding to M wake-up signals, to monitor N physical downlink control channels, where N is a positive integer greater than M, and M and N are positive integers greater than 1.

For example, it may be determined, through bit groups corresponding to M wake-up signals, to monitor K physical downlink control channels, where K is a positive integer less than M, and M and K are positive integers greater than 1.

With reference to the first aspect, in some implementations of the first aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

Optionally, the at least one component carrier is an active component carrier, and the at least one bandwidth part (BWP) is an active bandwidth part.

It should be noted that in this embodiment of this application, each of the at least one component carrier may be an active component carrier, and each of the at least one bandwidth part (BWP) may be an active bandwidth part (BWP).

It should be understood that in this embodiment of this application, the second mapping relationship may be a correspondence between the bit group corresponding to the at least one wake-up signal and the at least one component carrier, namely, a correspondence between a bit group generated by a plurality of wake-up signals and a plurality of component carriers. Alternatively, the second mapping relationship may be a correspondence between the bit group corresponding to the at least one wake-up signal and the at least one bandwidth part (BWP), that is, a correspondence between bit groups generated by a plurality of wake-up signals and the bandwidth part (BWP).

With reference to the first aspect, in some implementations of the first aspect, the method further includes the following.

When the communications device switches from monitoring a physical downlink control channel of a first bandwidth part (BWP) to sleeping, the communications device switches to an initial bandwidth part or a default bandwidth part.

With reference to the first aspect, in some implementations of the first aspect, the method further includes the following.

If the communications device does not monitor a physical downlink control channel of an active bandwidth part (BWP) in a first component carrier for duration exceeding a preset threshold, the communications device wakes up to monitor the physical downlink control channel of the active bandwidth part (BWP) in the first component carrier.

With reference to the first aspect, in some implementations of the first aspect, the at least one wake-up signal is a physical layer signal or a media access control (MAC) layer signal.

It should be noted that different WUSs may be used for different CCs of same UE, different UEs, or different groups of UEs.

For example, different WUSs may be distinguished in, but not limited to, the following two manners.

Manner 1: Distinguish through a physical layer. The physical layer may distinguish different WUSs through different time domain/frequency domain/code domain sending/receiving.

It should be understood that the network device sends WUSs of different CCs of same UE in the physical layer manner. For example, for different WUSs, the network devices may send corresponding WUSs by using different time frequency resources, or different WUSs may be distinguished through different scrambling codes carried in the WUSs.

For example, different WUSs are distinguished through different time domains. Assuming that sending cycles of a WUS 1 and a WUS 2 are the same and are both 20 seconds, a WUS sent at the fifth second in each cycle may be the WUS 1, and a WUS sent at the tenth second in each cycle may be the WUS 2. The communications device determines the WUS 1 or the WUS 2 based on WUSs received in different time domains.

Manner 2: Distinguish different WUSs through different bit positions at a MAC layer.

For example, a MAC control element (CE) is configured for the WUSs, and bits at different positions in the MAC CE correspond to different WUSs. For example, a bit value "0" or "1" may be used to respectively indicate that a WUS corresponding to a bit position of the bit value "0" is "not received" or a WUS corresponding to a bit position of the bit value "1" is "received". Alternatively, a bit value "1" or "0" may be used to respectively indicate that a WUS corresponding to a bit position of the bit value "1" is "not received" or a WUS corresponding to a bit position of the bit value "0" is "received". This is not limited in this application.

According to a second aspect, a method for monitoring a physical downlink control channel is provided. The method includes the following.

A network device determines at least one wake-up signal, where the at least one wake-up signal is used to indicate a communications device to monitor a physical downlink control channel of at least one bandwidth part (BWP).

The network device sends the at least one wake-up signal to the communications device.

In this embodiment of this application, the network device determines the at least one wake-up signal, and sends the at least one wake-up signal to the communications device, to indicate the communications device to monitor the physical downlink control channel of the at least one bandwidth part (BWP). Therefore, monitoring of a redundant PDCCH is reduced, and power consumption of the communications device is reduced.

It should be noted that in this embodiment of this application, a correspondence between the wake-up signal and the bandwidth part may be that one wake-up signal corresponds to one bandwidth part (BWP), or one wake-up signal corresponds to a plurality of bandwidth parts BWP, or a plurality of wake-up signals correspond to a plurality of bandwidth parts BWP.

With reference to the second aspect, in some implementations of the second aspect, the method further includes the following.

The network device sends a mapping relationship to the communications device, where the mapping relationship indicates a correspondence between the at least one wake-up signal and the at least one bandwidth part (BWP).

In this embodiment of this application, the communications device may determine, based on the at least one wake-up signal and the mapping relationship, to monitor at least one physical downlink control channel, thereby reducing monitoring of a redundant PDCCH and reducing power consumption of the communications device.

With reference to the second aspect, in some implementations of the second aspect, the mapping relationship includes a first mapping relationship, the at least one wake-up signal includes a first wake-up signal, and the first mapping relationship indicates a correspondence between the first wake-up signal and the at least one bandwidth part (BWP).

With reference to the second aspect, in some implementations of the second aspect, when one component carrier has one active bandwidth part (BWP), the first mapping relationship indicates a correspondence between the first wake-up signal and at least one component carrier.

Alternatively, when one component carrier has at least two active bandwidth parts BWP, the first mapping relationship indicates a correspondence between the first wake-up signal, at least one component carrier, and a bandwidth part (BWP) in the at least one component carrier.

Alternatively, when one component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

Optionally, the at least one component carrier is an active component carrier, and the at least one bandwidth part (BWP) is an active bandwidth part.

Optionally, when one component carrier has one active bandwidth part (BWP), the network device sends the first wake-up signal to the communications device, and the communications device determines, based on the first wake-up signal and the first mapping relationship, a physical downlink control channel of a component carrier corresponding to the first wake-up signal.

For example, when one component carrier has one active bandwidth part, the network device sends the first wake-up signal to the communications device, and the communications device may determine, based on the first wake-up signal, to monitor the physical downlink control channel of the component carrier corresponding to the first wake-up signal.

With reference to the second aspect, in some implementations of the second aspect, the mapping relationship includes a second mapping relationship, and the second mapping relationship indicates a correspondence between a bit group corresponding to the at least one wake-up signal and the at least one bandwidth part (BWP).

With reference to the second aspect, in some implementations of the second aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

Optionally, the at least one component carrier is an active component carrier, and the at least one bandwidth part (BWP) is an active bandwidth part.

With reference to the second aspect, in some implementations of the second aspect, the sending, by the network device, the at least one wake-up signal to the communications device includes the following.

The network device sends the at least one wake-up signal to the communications device through a physical layer.

Alternatively, the network device sends the at least one wake-up signal to the communications device through a media access control (MAC) layer.

It should be noted that different WUSs may be used for different CCs of same UE, different UEs, or different groups of UEs.

For example, different WUSs may be distinguished in, but not limited to, the following two manners.

Manner 1: Distinguish through the physical layer. The physical layer may distinguish different WUSs through different time domain/frequency domain/code domain sending/receiving.

It should be understood that the network device sends WUSs of different CCs of same UE in the physical layer manner. For example, for different WUSs, the network devices may send corresponding WUSs by using different time frequency resources, or different WUSs may be distinguished through different scrambling codes carried in the WUSs.

For example, different time domains are used for different WUSs. To be specific, a WUS sent at the fifth second may be a WUS 1, and a WUS sent at the tenth second may be a WUS 2. The communications device determines the WUS 1 or the WUS 2 based on WUSs received in different time domains.

Manner 2: Distinguish different WUSs through different bit positions at the MAC layer.

For example, a MAC CE is configured for the WUSs, and bits at different positions in the MAC CE correspond to different WUSs. For example, a bit value "0" or "1" may be used to respectively indicate that a WUS corresponding to a bit position of the bit value "0" is "not received" or a WUS corresponding to a bit position of the bit value "1" is "received". Alternatively, a bit value "1" or "0" may be used to respectively indicate that a WUS corresponding to a bit position of the bit value "1" is "not received" or a WUS corresponding to a bit position of the bit value "0" is "received". This is not limited in this application.

According to a third aspect, a communications device is provided. The communications device includes a transceiver unit, configured to detect at least one wake-up signal, and a processing unit, configured to determine, based on the at least one wake-up signal, to monitor at least one physical downlink control channel, where the at least one physical downlink control channel is a physical downlink control channel of at least one bandwidth part (BWP) indicated by the at least one wake-up signal.

With reference to the third aspect, in some implementations of the third aspect, the processing unit is specifically configured to determine, based on the at least one wake-up signal and a mapping relationship, to monitor the at least one physical downlink control channel, where the mapping relationship indicates a correspondence between the at least one wake-up signal and the at least one bandwidth part (BWP).

With reference to the third aspect, in some implementations of the third aspect, the transceiver unit is further configured to obtain the mapping relationship configured by a network device.

With reference to the third aspect, in some implementations of the third aspect, the at least one wake-up signal includes a first wake-up signal, the mapping relationship includes a first mapping relationship, the first mapping relationship indicates a correspondence between the first wake-up signal and the at least one bandwidth part (BWP), and the processing unit is specifically configured to determine, based on the first wake-up signal and the first mapping relationship, to monitor the at least one physical downlink control channel.

With reference to the third aspect, in some implementations of the third aspect, when one component carrier has one active bandwidth part (BWP), the first mapping relationship indicates a correspondence between the first wake-up signal and at least one component carrier.

Alternatively, when one active component carrier has at least two active bandwidth parts BWP, the first mapping relationship indicates a correspondence between the first wake-up signal, at least one component carrier, and a bandwidth part (BWP) in the at least one component carrier.

Alternatively, when one active component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

With reference to the third aspect, in some implementations of the third aspect, the mapping relationship includes a second mapping relationship, the second mapping relationship indicates a correspondence between a bit group corresponding to the at least one wake-up signal and the at least one bandwidth part (BWP), and the processing unit is specifically configured to generate the bit group corresponding to the at least one wake-up signal, and determine, based on the bit group and the second mapping relationship, to monitor the at least one physical downlink control channel.

With reference to the third aspect, in some implementations of the third aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

With reference to the third aspect, in some implementations of the third aspect, the processing unit is further configured to when the communications device switches from monitoring a physical downlink control channel of a first bandwidth part (BWP) to sleeping, switch to an initial bandwidth part or a default bandwidth part.

With reference to the third aspect, in some implementations of the third aspect, the processing unit is further configured to if the communications device does not monitor a physical downlink control channel of an active bandwidth part (BWP) in a first component carrier for duration exceeding a preset threshold, wake up to monitor the physical downlink control channel of the active bandwidth part (BWP) in the first component carrier.

With reference to the third aspect, in some implementations of the third aspect, the at least one wake-up signal is a physical layer signal or a media access control MAC layer signal.

According to a fourth aspect, a network device is provided. The network device includes a processing unit, configured to determine at least one wake-up signal, where the at least one wake-up signal is used to indicate a communications device to monitor a physical downlink control channel of at least one bandwidth part (BWP), and a transceiver unit, configured to send the at least one wake-up signal to the communications device.

With reference to the fourth aspect, in some implementations of the fourth aspect, the transceiver unit is further configured to send a mapping relationship to the communications device, where the mapping relationship indicates a correspondence between the at least one wake-up signal and the at least one bandwidth part (BWP).

With reference to the fourth aspect, in some implementations of the fourth aspect, the mapping relationship includes a first mapping relationship, the at least one wake-up signal includes a first wake-up signal, and the first mapping relationship indicates a correspondence between the first wake-up signal and the at least one bandwidth part (BWP).

With reference to the fourth aspect, in some implementations of the fourth aspect, when one component carrier has one active bandwidth part (BWP), the first mapping relationship indicates a correspondence between the first wake-up signal and at least one component carrier.

Alternatively, when one component carrier has at least two active bandwidth parts BWP, the first mapping relationship indicates a correspondence between the first wake-up signal, at least one component carrier, and a bandwidth part (BWP) in the at least one component carrier.

Alternatively, when one component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

With reference to the fourth aspect, in some implementations of the fourth aspect, the mapping relationship includes a second mapping relationship, and the second mapping relationship indicates a correspondence between a bit group corresponding to the at least one wake-up signal and the at least one bandwidth part (BWP).

With reference to the fourth aspect, in some implementations of the fourth aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

With reference to the fourth aspect, in some implementations of the fourth aspect, the transceiver unit is specifically configured to send the at least one wake-up signal to the communications device through a physical layer, or send the at least one wake-up signal to the communications device through a media access control MAC layer.

According to a fifth aspect, a communications device is provided. The communications device includes a transceiver, a memory, configured to store an instruction, and a processor, separately connected to the memory and the transceiver, and configured to execute the instruction stored in the memory, to perform the following steps when executing the instruction.

The transceiver is configured to detect at least one wake-up signal.

The processor is configured to determine, based on the at least one wake-up signal, to monitor at least one physical downlink control channel, where the at least one physical downlink control channel is a physical downlink control channel of at least one bandwidth part (BWP) indicated by the at least one wake-up signal.

With reference to the fifth aspect, in some implementations of the fifth aspect, the processor is specifically configured to determine, based on the at least one wake-up signal and a mapping relationship, to monitor the at least one physical downlink control channel, where the mapping relationship indicates a correspondence between the at least one wake-up signal and the at least one bandwidth part (BWP).

With reference to the fifth aspect, in some implementations of the fifth aspect, the transceiver is configured to obtain the mapping relationship configured by a network device.

With reference to the fifth aspect, in some implementations of the fifth aspect, the at least one wake-up signal includes a first wake-up signal, the mapping relationship includes a first mapping relationship, the first mapping relationship indicates a correspondence between the first wake-up signal and the at least one bandwidth part (BWP), and the processor is specifically configured to determine, based on the first wake-up signal and the first mapping relationship, to monitor the at least one physical downlink control channel.

With reference to the third aspect, in some implementations of the fifth aspect, when one component carrier has one active bandwidth part (BWP), the first mapping relationship indicates a correspondence between the first wake-up signal and at least one component carrier.

Alternatively, when one active component carrier has at least two active bandwidth parts BWP, the first mapping relationship indicates a correspondence between the first wake-up signal, at least one component carrier, and a bandwidth part (BWP) in the at least one component carrier.

Alternatively, when one active component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

With reference to the fifth aspect, in some implementations of the fifth aspect, the mapping relationship includes a second mapping relationship, the second mapping relationship indicates a correspondence between a bit group corresponding to the at least one wake-up signal and the at least one bandwidth part (BWP), and the processor is specifically configured to generate the bit group corresponding to the at least one wake-up signal, and determine, based on the bit group and the second mapping relationship, to monitor the at least one physical downlink control channel.

With reference to the fifth aspect, in some implementations of the fifth aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

With reference to the fifth aspect, in some implementations of the fifth aspect, the processor is further configured to when the communications device switches from monitoring a physical downlink control channel of a first bandwidth part (BWP) to sleeping, switch to an initial bandwidth part or a default bandwidth part.

With reference to the fifth aspect, in some implementations of the fifth aspect, the processor is further configured to if the communications device does not monitor a physical downlink control channel of an active bandwidth part (BWP) in a first component carrier for duration exceeding a preset threshold, wake up to monitor the physical downlink control channel of the active bandwidth part (BWP) in the first component carrier.

With reference to the fifth aspect, in some implementations of the fifth aspect, the at least one wake-up signal is a physical layer signal or a media access control MAC layer signal.

According to a sixth aspect, a network device is provided. The network device includes a transceiver, a memory, configured to store an instruction, and a processor, separately connected to the memory and the transceiver, and configured to execute the instruction stored in the memory, to perform the following steps when executing the instruction.

The processor is configured to determine at least one wake-up signal, where the at least one wake-up signal is used to indicate a communications device to monitor a physical downlink control channel of at least one bandwidth part (BWP).

The transceiver is configured to send the at least one wake-up signal to the communications device.

With reference to the sixth aspect, in some implementations of the sixth aspect, the transceiver is further configured to send a mapping relationship to the communications device, where the mapping relationship indicates a correspondence between the at least one wake-up signal and the at least one bandwidth part (BWP).

With reference to the sixth aspect, in some implementations of the sixth aspect, the mapping relationship includes a first mapping relationship, the at least one wake-up signal includes a first wake-up signal, and the first mapping relationship indicates a correspondence between the first wake-up signal and the at least one bandwidth part (BWP).

With reference to the sixth aspect, in some implementations of the sixth aspect, when one component carrier has one active bandwidth part (BWP), the first mapping relationship indicates a correspondence between the first wake-up signal and at least one component carrier.

Alternatively, when one component carrier has at least two active bandwidth parts BWP, the first mapping relationship indicates a correspondence between the first wake-up signal, at least one component carrier, and a bandwidth part (BWP) in the at least one component carrier.

Alternatively, when one component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

With reference to the sixth aspect, in some implementations of the sixth aspect, the mapping relationship includes a second mapping relationship, and the second mapping relationship indicates a correspondence between a bit group corresponding to the at least one wake-up signal and the at least one bandwidth part (BWP).

With reference to the sixth aspect, in some implementations of the sixth aspect, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

With reference to the sixth aspect, in some implementations of the sixth aspect, the transceiver is specifically configured to send the at least one wake-up signal to the communications device through a physical layer, or send the at least one wake-up signal to the communications device through a media access control MAC layer.

According to a seventh aspect, a communications device is provided. The communications device includes a memory, a processor, a transceiver, and a computer program that is stored in the memory and that can be run on the processor. When executing the computer program, the processor performs the method according to any one of the first aspect or the possible implementations of the first aspect.

According to an eighth aspect, a network device is provided. The network device includes a memory, a processor, a transceiver, and a computer program that is stored in the memory and that can be run on the processor. When executing the computer program, the processor performs the method according to any one of the first aspect or the possible implementations of the first aspect.

According to a ninth aspect, this application provides a computer-readable medium, configured to store a computer program. The computer program includes an instruction used to perform the method according to any one of the first aspect or the possible implementations of the first aspect.

According to a tenth aspect, this application provides a computer-readable medium, configured to store a computer program. The computer program includes an instruction used to perform the method according to any one of the second aspect or the possible implementations of the second aspect.

According to an eleventh aspect, this application provides a computer program product including an instruction. When the computer program product runs on a computer, the computer is enabled to perform the method according to any one of the first aspect or the possible implementations of the first aspect.

According to a twelfth aspect, this application provides a computer program product including an instruction. When the computer program product runs on a computer, the computer is enabled to perform the method according to any one of the second aspect or the possible implementations of the second aspect.

According to a thirteenth aspect, this application provides a chip system. The chip system includes a processor and is configured for a communications device to implement functions in the foregoing aspects, for example, obtaining or processing information in the foregoing methods. In a possible design, the chip system further includes a memory, and the memory is configured to store a program instruction and data that are necessary for an access network device. The chip system may include a chip, or may include a chip and another discrete device.

According to a fourteenth aspect, this application provides a chip system. The chip system includes a processor and is configured for a network device to implement functions in the foregoing aspects, for example, sending or processing information in the foregoing methods. In a possible design, the chip system further includes a memory, and the memory is configured to store a program instruction and data that are necessary for a terminal device. The chip system may include a chip, or may include a chip and another discrete device.

DETAILED DESCRIPTION OF ILLUSTRATIVE EMBODIMENTS

Figure 1:
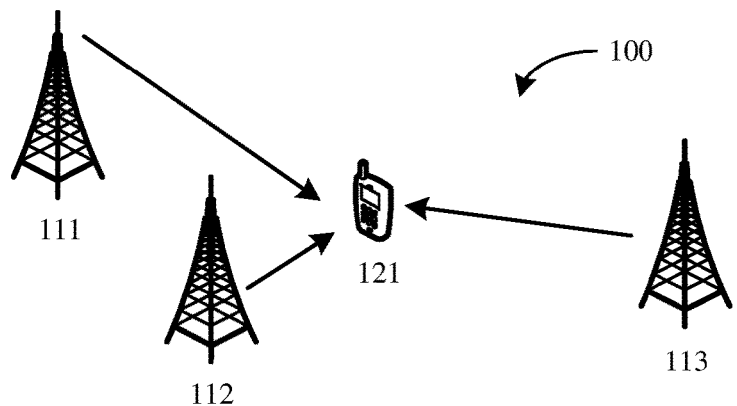
FIG. 1 is a schematic diagram of a possible network architecture in which an embodiment of this application is used.

The following describes technical solutions of this application with reference to accompanying drawings.

The technical solutions of embodiments of this application may be applied to various communications systems, such as a global system for mobile communications (GSM) system, a code division multiple access (CDMA) system, a wideband code division multiple access (WCDMA) system, a general packet radio service (general packet radio service, GPRS) system, a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

As an example instead of a limitation, the terminal device in the embodiments of this application may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, a user apparatus, or the like. The terminal device may be a station (ST) in a WLAN, and may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, and a next generation communications system, for example, a terminal device in a 5G network, or a terminal device in a future evolved public land mobile network (PLMN).

As an example instead of a limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but is used to implement a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, or smart jewelry for monitoring physical signs.

In addition, the terminal device in the embodiments of this application may alternatively be a terminal device in an internet of things (IoT) system. IoT is an important part of development of future information technologies. A main technical feature of the IoT is connecting a thing to a network by using a communications technology, to implement an intelligent network for interconnection between a person and a machine or between one thing and another.

In the embodiments of this application, an IoT technology may implement massive connections, deep coverage, and terminal power saving by using, for example, a narrowband (NB) technology. For example, NB includes only one resource block (RB). In other words, a bandwidth of NB is only 180 KB. To implement massive access, terminals are required to be discrete in access. According to a communication method in the embodiments of this application, a congestion problem that occurs when massive terminals access a network through the NB in the IoT technology can be effectively resolved.

In the embodiments of this application, a receiver of data sent by the terminal device may be, for example, an access network device. The access network device may be an access point (AP) in the WLAN, a base transceiver station (BTS) in the GSM or CDMA, a NodeB (NB) in WCDMA, a gNB in the new radio (NR) system, or an evolved NodeB (eNB or eNodeB) in LTE, or a relay station or an access point, or a vehicle-mounted device, a wearable device, an access network device in the future 5G network, an access network device in the future evolved PLMN network, or the like.

In addition, in the embodiments of this application, the access network device serves a cell. The terminal device communicates with the access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are suitable for providing a high-rate data transmission service.

In addition, a plurality of cells may simultaneously work in a same frequency band on a carrier in the LTE system or the 5G system. In some special scenarios, the concept of the carrier is considered equivalent to that of the cell. For example, in a carrier aggregation (CA) scenario, both a carrier index of a secondary carrier and a cell identifier (Cell ID) of a secondary cell that works on the secondary carrier are carried when the secondary carrier is configured for UE. In this case, it may be considered that the concept of the carrier is equivalent to that of the cell. For example, that the UE accesses a carrier is equivalent to that the UE accesses a cell.

In the embodiments of this application, the receiver of the data sent by the terminal device may be, for example, an access network device or a core network device. The core network device may be connected to a plurality of access network devices, and is configured to control the access network device, and can distribute, to the access network device, data received from a network side (for example, the internet).

The foregoing listed functions and specific implementations of the terminal device, the access network device, and the core network device are merely examples for description, and this application is not limited thereto.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

It should be noted that in the embodiments of this application, a plurality of applications may be run at an application layer. In this case, an application for performing the communication method in the embodiments of this application and an application configured to control a receive end device to implement an action corresponding to received data may be different applications.

FIG. 1 is a schematic diagram of a system 100 to which a communication method according to an embodiment of this application is applicable.

As shown in FIG. 1, the wireless communications system 100 may include one or more network devices, for example, a network device #1 111, a network device #2 112, and a network device #3 113 shown in FIG. 1. The wireless communications system 100 may further include one or more communications devices, for example, a communications device 121 shown in FIG. 1.

The wireless communications system 100 may also support Coordinated Multi-Point (CoMP) transmission. In other words, a plurality of cells or a plurality of network devices may coordinately participate in transmitting data to one communications device or jointly receive data sent by one communications device, or a plurality of cells or a plurality of network devices perform coordinated scheduling or coordinated beamforming. The plurality of cells may belong to a same network device or different network devices, and may be selected based on a channel gain or a path loss, received signal strength, a received signal instruction, or the like.

Optionally, in the communications system 100 shown in FIG. 1, one of the network device #1 111 to the network device #3 113 (for example, the network device #1) may be a serving network device. The serving network device may be a network device that provides at least one of a radio resource control (RRC) connection, non-access stratum (NAS) mobility management, and security input for the communications device by using a radio air interface protocol. Optionally, the network device #2 112 and the network device #3 113 may be coordinated network devices. The serving network device may send control signaling to the communications device, and the coordinated network device may send data to the communications device, or the serving network device may send control signaling to the communications device, and the serving network device and the coordinated network device may send data to the communications device, or both the serving network device and the coordinated network device may send control signaling to the communications device, and both the serving network device and the coordinated network device may send data to the communications device, or the coordinated network device may send control signaling to the communications device, and at least one of the serving network device and the coordinated network device may send data to the communications device, or the coordinated network device may send control signaling and data to the communications device. This is not particularly limited in the embodiments of this application.

It should be understood that for ease of understanding, FIG. 1 shows only an example of the network device #1 111 to the network device #3 113 and the communications device. However, this should not constitute any limitation on this application. The wireless communications system may further include more or fewer network devices, or may include more communications devices. Network devices communicating with different communications devices may be a same network device, or may be different network devices. Quantities of network devices communicating with different communications devices may be the same, or may be different. This is not limited in this application.

The following uses the network device #1 111 and the communications device 121 as an example to briefly describe communication between the network device and the communications device.

The network device #1 111 may include one or more antennas. In addition, the network device #1 111 may additionally include a transmitter chain and a receiver chain. A person of ordinary skill in the art may understand that both the transmitter chain and the receiver chain may include a plurality of components (such as a processor, a modulator, a multiplexer, a demodulator, a demultiplexer, or an antenna) related to signal sending and receiving.

The network device #1 111 may communicate with a plurality of communications devices. The communications device 121 may be, for example, a cellular phone, an intelligent telephone, a portable computer, a hand-held communications device, a hand-held computing device, a satellite radio apparatus, a global positioning system, a PDA, and/or any other appropriate device used for communication in the wireless communications system 100.

As shown in FIG. 1, the communications device 121 communicates with the network device #1 111. The network device #1 111 sends information to the communications device 121 through a forward link (also referred to as a downlink), and receives information from the communications device 121 through a reverse link (also referred to as an uplink).

For example, in a frequency division duplex (FDD) system, for example, different frequency bands may be used for the forward link and the reverse link.

For another example, in a time division duplex (TDD) system and a full-duplex system, a same frequency band may be used for the forward link and the reverse link.

Each antenna (or an antenna group including a plurality of antennas) and/or each area designed for communication are/is referred to as a sector of the network device #1 111.

For example, the antenna group may be designed to communicate with the communications device in the sector within coverage of the network device #1 111. The network device #1 111 may send a signal to all communications devices in the sector corresponding to the network device #1 111 by using a single antenna or a multi-antenna transmit diversity. In a process in which the network device #1 111 communicates with the communications device 121 through the forward link, a transmit antenna of the network device #1 111 may also improve a signal-to-noise ratio of the forward link through beamforming.

In addition, compared with that in the manner in which the network device #1 111 sends the signal to all the communications devices served by the network device #1 111 by using the single antenna or the multi-antenna transmit diversity, a mobile device in a neighboring cell is less interfered when the network device #1 111 sends, through beamforming, the signal to the communications devices 121 that are randomly distributed within related coverage.

At given time, the network device #1 111, and the communications device 121 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications device, or store in a memory) a specific quantity of data bits to be sent, through a channel, to the wireless communications receiving apparatus. The data bit may be included in a transport block (or a plurality of transport blocks) of the data, and the transport block may be segmented to generate a plurality of code blocks.

In addition, the communications system 100 may be a PLMN network, a D2D network, an M2M network, an IoT network, or another network. FIG. 1 is merely an example of a simplified schematic diagram. The network may further include another network device or communications device, which is not drawn in FIG. 1.

For ease of understanding, before describing the method for monitoring a physical downlink control channel and the communications device in this application, the following describes related terms and principles in the embodiments of this application.

1. A wireless communications resource used in the communications system 100 is described in detail.

In the embodiments of this application, the wireless communications resource may include a plurality of dimensions such as a time domain, a frequency domain, a space domain, and a code domain.

For example, in this application, a resource may be divided into a plurality of time units in time domain.

In addition, in the embodiments of this application, the plurality of time units may be continuous, or some adjacent time units may be spaced by preset intervals. This is not particularly limited in the embodiments of this application.

2. Carrier Aggregation (CA)

To satisfy requirements on a better single-user peak rate and a higher system capacity, a direct method is increasing a system transmission bandwidth. Therefore, CA is introduced to an LTE-advanced system to increase a transmission bandwidth.

The CA technology allows for aggregation of two to five LTE component carriers (CC) to expand the transmission bandwidth to up to 100 MHz, thereby effectively improving uplink and downlink transmission rates. A terminal determines, based on a service capability, a maximum quantity of carriers that can be used for uplink and downlink transmission.

Functions of CA may support aggregation of contiguous or non-contiguous carriers. Each carrier can use a maximum of 110 RBs. Each user uses an independent hybrid automatic repeat request (HARQ) entity on each carrier, and each transport block can be mapped to only one specific carrier. PDCCHs on all carriers are independent of each other, and a PDCCH on each carrier is used to allocate resources to a physical downlink shared channel (PDSCH) and a physical uplink shared channel (PUSCH) on each carrier. Alternatively, a carrier indicator field (CIF) domain may be used to schedule uplink and downlink resource allocation of a plurality of carriers through a PDCCH channel on one carrier.

3. Working Principle of Discontinuous Reception (DRX)

In LTE, a DRX function control entity is located at a MAC layer of a protocol stack, and a main function of the DRX function control entity is to control sending an instruction to a physical layer, to indicate the physical layer to monitor a PDCCH at a specific time, that is, to be in an active period. In other time, a receive antenna is not enabled, and the physical layer is in a sleep state.

When a DRX function is configured for UE, the UE monitors the PDCCH in the active period. If the DRX function is configured in RRC_connect, the UE uses a DRX operation to discontinuously monitor the PDCCH.

Figure 2:
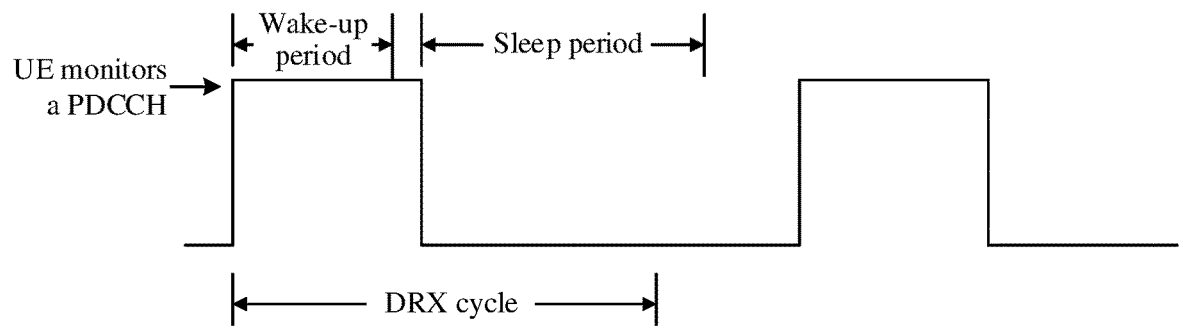
FIG. 2 is a schematic diagram of a structure of discontinuous reception (DRX) according to the prior art.

As shown in FIG. 2, when DRX is configured, the UE does not need to continuously monitor the PDCCH. On-duration is a time period in which the UE waits for receiving the PDCCH after waking up. A DRX cycle refers to a repetition cycle of the on-duration in the preceding figure and a possible subsequent inactive time period.

4. Bandwidth Part (Bandwidth Part, BWP)

The BWP is a part of a carrier bandwidth. One BWP may be a segment of contiguous frequency resources on one carrier. A network may configure a plurality of BWPs for one terminal, and bandwidths of the plurality of BWPs may be different. The network may also configure BWPs of different bandwidth sizes for different terminal devices. The network may send an activation command to activate one of the plurality of configured BWPs. After one BWP is configured and activated, this BWP is referred to as an active BWP. The active BWP includes an active downlink (DL) BWP and an active uplink (UL) BWP. In addition, the terminal device sends data and control information in the active UL BWP, and receives data and control information in the active DL BWP. In a possible implementation, one terminal device supports only one active BWP, and the terminal device transmits data on only one BWP at any moment. A BWP allocated to the terminal device during initial access is referred to as an initial BWP (initial BWP). For example, a value of an identifier of the initial BWP is 0.

5. Wake-Up Signal (WUS)

In an NR system, a proportion of high-speed data transmission services increases, and a maximum rate also increases. The NR system supports high-speed data transmission, so that user data may be generated in a burst mode and within a short period of time. An effective UE power saving mechanism is that the UE stays in a power saving mode (for example, micro-sleep or an OFF period of a long DRX cycle) unless the UE is informed by the UE power saving mechanism (for example, a WUS mechanism) to access the network. For example, when there is no service transmission, the network device may assist the UE in switching from a "network access" mode to a "power effective" mode.

Figure 3:
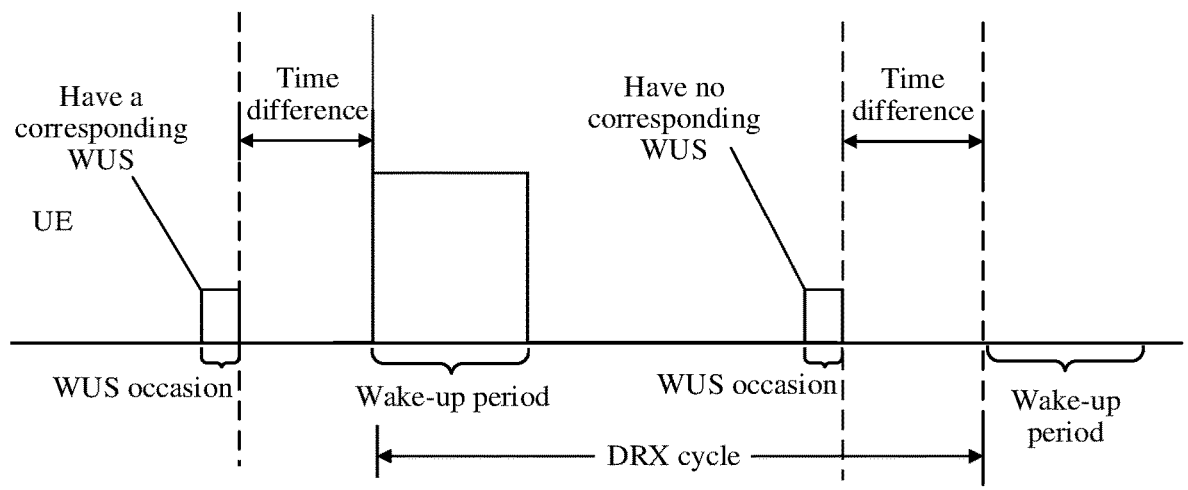
FIG. 3 is a schematic diagram of monitoring of a physical downlink control channel based on a wake-up signal (WUS) and discontinuous reception (DRX)

FIG. 3 is a schematic diagram of a PDCCH monitoring process based on a WUS and DRX.

As shown in FIG. 3, in a WUS application manner, the WUS is sent before on-duration, and a time difference between the WUS and the on-duration is recorded as a GAP. A network device can send a receiving position of a WUS of the network device to UE in advance, for example, send a duration GAP that is earlier than on-duration corresponding to the network device. A height in FIG. 3 is only used to represent a relative current or power value obtained by detecting various signals.

For example, if the network device determines that the UE has scheduling in the first DRX cycle in FIG. 3, the network device sends, before on-duration of the DRX cycle of the UE, a WUS to the UE to indicate to wake the UE up, so that the UE normally monitors a PDCCH in the corresponding on-duration. If the network device determines that the UE has no scheduling in the second DRX cycle in FIG. 3, the network device does not send, before on-duration of the DRX cycle, a WUS to the UE to indicate to wake the UE up so that the UE does not monitor a PDCCH in the corresponding on-duration, thereby reducing unnecessary power consumption.

It should be noted that the network device may configure a set of UE power saving signals for one UE or a group of UEs.

In a carrier aggregation scenario, one UE may simultaneously receive or transmit on one or more CCs according to a capability of the UE. From the perspective of an RRC layer, when CA is configured, there is only one RRC connection between the UE and a network. During RRC connection establishment/re-establishment/handover, a serving cell provides NAS mobility information, or during RRC connection re-establishment/handover, a serving cell provides security input and is referred to as a primary cell. In addition, a secondary cell may be configured for the UE according to the capability of the UE, and the secondary cell and the primary cell form a serving cell set, where each serving cell corresponds to one of the foregoing CCs.

CA supports two CC manners: contiguous CCs and non-contiguous CCs. When CA is deployed, frame timing and an SFN are aligned across all cells that can be aggregated. If a MAC entity is configured with one or more secondary cells, the network may activate or deactivate the configured secondary cell. When a secondary cell is activated, a PDCCH on the secondary cell and a PDCCH for the secondary cell are monitored. The network device configures a plurality of active CCs for the UE, and the UE may need to use only a part of the configured active CCs based on a service capability. However, the UE needs to perform monitoring of a redundant PDCCH on each CC.

Figure 4:
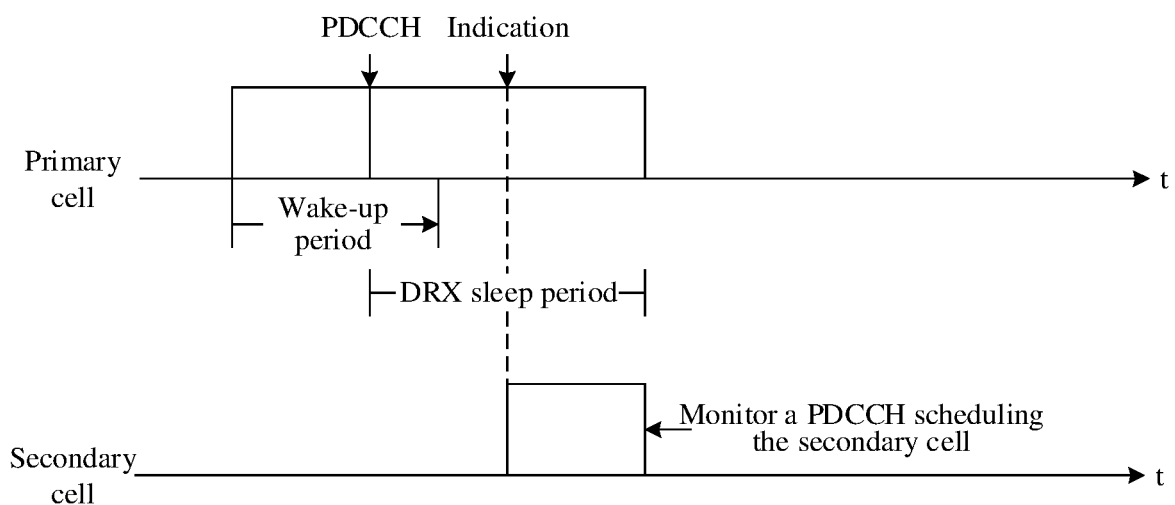
FIG. 4 is a schematic diagram of using a wake-up signal (WUS) in a carrier aggregation (CA) scenario according to the prior art.

FIG. 4 is a schematic diagram of combining a WUS and CA in the prior art. In the prior art, a network device may send a WUS on an active CC to indicate to monitor a PDCCH on another CC. For example, in FIG. 4, the network device may send, in a primary cell, a WUS to indicate UE to start to monitor a PDCCH for scheduling a secondary cell. After receiving indication information, the UE monitors, based on a connected mode DRX (C-DRX) configuration, a PDCCH in a serving cell indicated by the indication information. However, in the prior art, for same UE, a control relationship between a WUS of the UE and PDCCH monitoring on each corresponding CC is monotonous, and this affects flexibility and efficiency of applying the WUS in CA.

In addition, a scenario in which one CC simultaneously activates a plurality of BWPs is not considered in the prior art. Therefore, that a flexible WUS is proposed to control the UE to monitor a PDCCH on each active CC and BWP, so as to reduce unnecessary PDCCH monitoring to reduce power consumption of the UE is a problem worthy of research.

In view of this, an embodiment of this application provides a communication method. In a one-to-one mapping manner, a one-to-many mapping manner, a many-to-many mapping manner, or the like, a WUS is used to control UE to perform PDCCH monitoring on each CC (and a BWP) of the UE, thereby reducing unnecessary PDCCH monitoring to reduce power consumption of the UE.

Figure 5:
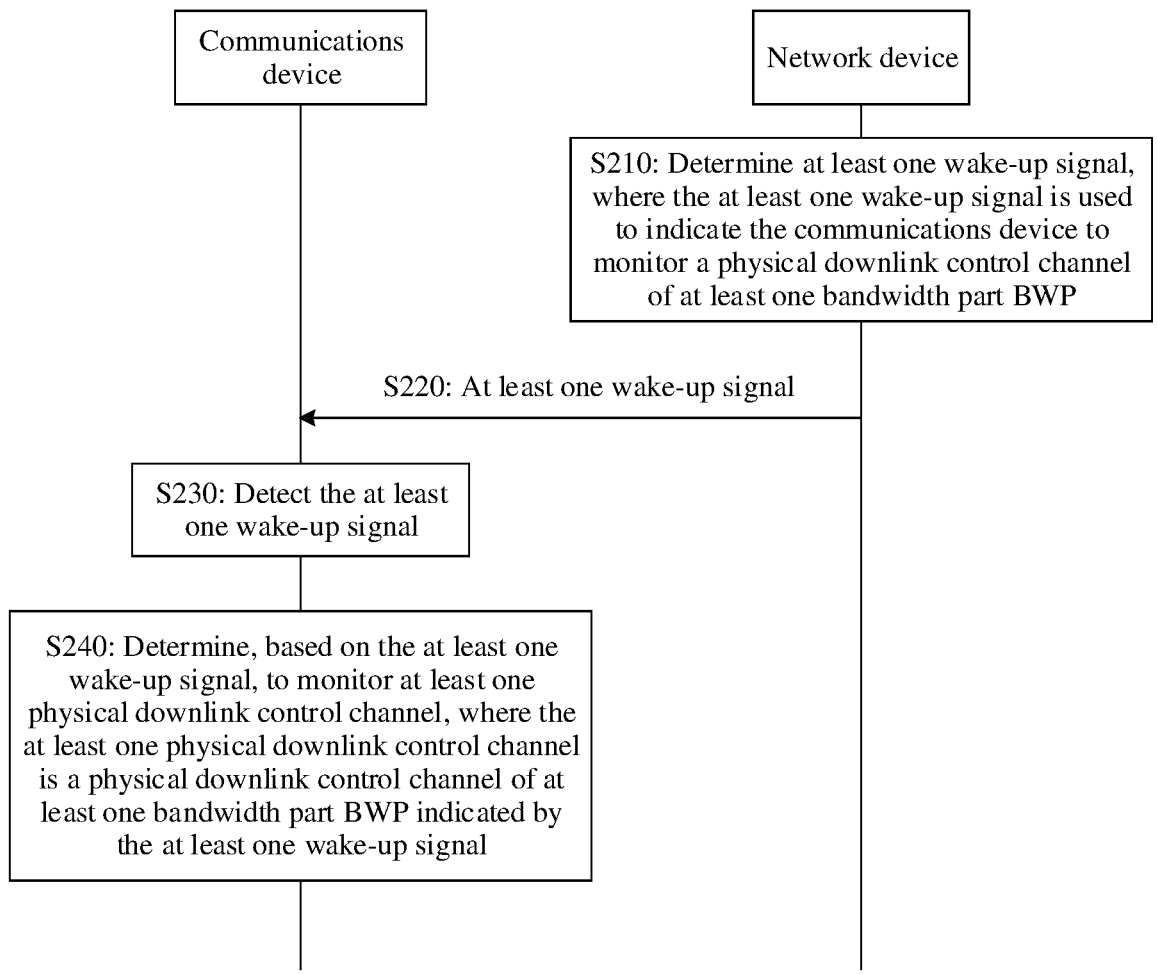
FIG. 5 is a schematic diagram of a method for monitoring a physical downlink control channel according to an embodiment of this application.

With reference to FIG. 5, the following specifically describes a method for monitoring a physical downlink control channel according to an embodiment of this application.

FIG. 5 is a schematic interaction diagram of a method for monitoring a physical downlink control channel according to an embodiment of this application. A communications device may be the communications device 121 in FIG. 1, and a network device may be any network device shown in FIG. 1.

S210: The network device determines at least one wake-up signal, where the at least one wake-up signal is used to indicate the communications device to monitor a physical downlink control channel of at least one bandwidth part (BWP).

For example, the network device may determine a quantity of WUSs configured for a communications device, to indicate, through the WUS, the communications device to monitor a PDCCH on each CC.

S220: The network device sends the at least one wake-up signal to the communications device.

It should be noted that different WUSs may be used for different CCs of same UE, different UEs, or different groups of UEs.

For example, different WUSs may be distinguished in, including but not limited to, the following two manners.

Manner 1: Distinguish through a physical layer. The physical layer may distinguish different WUSs through different time domain/frequency domain/code domain sending/receiving.

It should be understood that the network device sends WUSs of different CCs of same UE in the physical layer manner. For example, for different WUSs, the network devices may send corresponding WUSs by using different time frequency resources, or different WUSs may be distinguished through different scrambling codes carried in the WUSs.

For example, different time domains are used for different WUSs. To be specific, a WUS sent at the fifth second may be a WUS 1, and a WUS sent at the tenth second may be a WUS 2. The communications device determines the WUS 1 or the WUS 2 based on WUSs received in different time domains.

Manner 2: Distinguish different WUSs through different bit positions at a MAC layer.

For example, a MAC CE is configured for the WUSs, and bits at different positions in the MAC CE correspond to different WUSs. For example, a bit value "0" or "1" is used to respectively indicate that a WUS corresponding to a bit position of the bit value "0" is "not received" or a WUS corresponding to a bit position of the bit value "1" is "received". Alternatively, a bit value "1" or "0" may be used to respectively indicate that a WUS corresponding to a bit position of the bit value "1" is "not received" or a WUS corresponding to a bit position of the bit value "0" is "received". This is not limited in this application.

S230: The communications device detects the at least one wake-up signal.

It should be understood that the communications device may receive configuration information sent by the network device, and determine detected different WUSs based on the configuration information.

For example, if the configuration information indicates that a receiving position of the wake-up signal (WUS) 2 is a frequency domain position, and if the communications device detects a wake-up signal at the frequency domain position, the wake-up signal is the WUS 2.

S240: The communications device determines, based on the at least one wake-up signal, to monitor at least one physical downlink control channel, where the at least one physical downlink control channel is a physical downlink control channel of at least one bandwidth part (BWP) indicated by the at least one wake-up signal.

It should be noted that the network device detects the at least one wake-up signal, and determines, based on the wake-up signal, a physical downlink channel that needs to be monitored and that is of a component carrier or a bandwidth part.

In an example, the communications device may obtain a mapping relationship configured by the network device, where the mapping relationship indicates a correspondence between the at least one wake-up signal and the at least one bandwidth part (BWP).

Optionally, the mapping relationship may indicate a correspondence between the at least one wake-up signal and at least one component carrier.

Optionally, the communications device determines, based on the at least one wake-up signal and the mapping relationship, to monitor a physical downlink control channel of a component carrier or a bandwidth part corresponding to the at least one wake-up signal.

It should be understood that, in this embodiment of this application, both the component carrier and the bandwidth part corresponding to the wake-up signal may be active.

It should be noted that, in this embodiment of this application, the mapping relationship may be a correspondence between one wake-up signal and one component carrier or bandwidth part, or may be a correspondence between one wake-up signal and a plurality of component carriers or bandwidth parts, or may be a correspondence between a plurality of wake-up signals and a plurality of component carriers or bandwidth parts. Therefore, the network device indicates, by using the wake-up signal, the communications device to monitor a physical downlink control channel on each component carrier or bandwidth part.

In a first possible implementation, the mapping relationship configured by the network device is a correspondence between one wake-up signal and the at least one bandwidth part (BWP).

For example, the network device sends a first wake-up signal to the communications device, and the communications device detects the first wake-up signal, and determines, based on the first wake-up signal and a first mapping relationship, to monitor a physical downlink channel of at least one bandwidth part (BWP) corresponding to the first wake-up signal.

The first mapping relationship may indicate a correspondence between the first wake-up signal and at least one component carrier or bandwidth part (BWP).

Optionally, when one active component carrier has one active bandwidth part (BWP), the first mapping relationship indicates a correspondence between the first wake-up signal and at least one component carrier.

For example, the first mapping relationship may include a correspondence between one WUS and one CC.

If the first mapping relationship may include that the WUS 1 corresponds to an active CC 1, the WUS 2 corresponds to an active CC 2, a WUS 3 corresponds to an active CC 3, and each of the active CC 1, the active CC 2, and the active CC 3 has only one active BWP. If the communications device detects the WUS 1, it indicates that the communications device needs to monitor a physical downlink control channel of the CC 1, that is, the communications device needs to monitor a physical downlink channel of an active bandwidth part in the CC 1.

It should be understood that the foregoing case may be applicable to a case in which a quantity of WUSs configured by the network device for the communications device is not less than a quantity of active CCs of the communications device.

For example, the first mapping relationship includes a correspondence between one WUS and a plurality of CCs.

If the first mapping relationship may include that the WUS 1 corresponds to an active CC 1 and an active CC 2, the WUS 2 corresponds to an active CC 3, an active CC 4, and an active CC 5, and if the communications device detects the WUS 1, the communications device monitors the PDCCH on the CC 1 and the CC 2 according to a C-DRX configuration of the communications device.

It should be understood that the foregoing case may be applicable to a case in which a quantity of WUSs configured by the network device for the UE is less than a quantity of active CCs of the UE.

For example, the first mapping relationship includes a correspondence between one WUS and one group of CCs.

If the first mapping relationship may include that the WUS 1 corresponds to a plurality of active CCs included in an active CC group 1, and if the UE receives the WUS 1, the UE monitors the PDCCH on the CC group 1 according to a C-DRX configuration of the UE.

It should be understood that the foregoing case may be applicable to a case in which a quantity of WUSs configured by the network device for the UE is less than a quantity of active CCs of the UE.

Optionally, when one component carrier has at least two active bandwidth parts, the first mapping relationship indicates a correspondence between the first wake-up signal, at least one component carrier, and a bandwidth part in the at least one component carrier.

It should be understood that the at least one component carrier is an active component carrier, and the at least one bandwidth part (BWP) is an active bandwidth part (BWP).

After the network device determines a quantity of WUSs configured for UE, the network device may control, by using the WUS, the UE to monitor a PDCCH on each active BWP of each active CC of the UE. It is assumed that the UE has three active CCs, where there are four active BWPs in a CC 1, and there are two active BWPs in each of a CC 2 and a CC 3.

Figure 6:
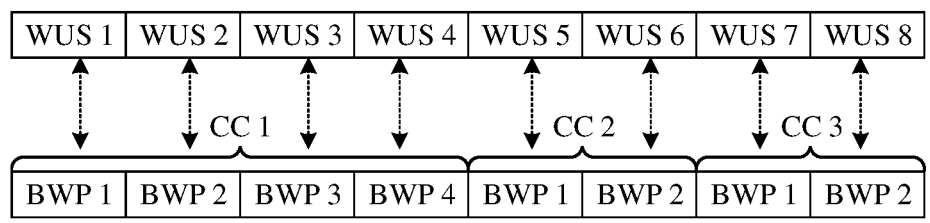
FIG. 6 is a schematic diagram of a correspondence between a wake-up signal (WUS) and a bandwidth part (BWP) according to an embodiment of this application.

For example, one WUS corresponds to one BWP. FIG. 6 shows a correspondence between a wake-up signal, an active CC, and an active BWP.

As shown in FIG. 6, one WUS corresponds to one BWP. In other words, a WUS 1 may correspond to a BWP 1 in a CC 1, a WUS 2 corresponds to a BWP 2 in the CC 1, a WUS 3 corresponds to a BWP 3 in the CC 1, a WUS 4 corresponds to a BWP 4 in the CC 1, a WUS 5 corresponds to a BWP 1 in a CC 2, a WUS 6 corresponds to a BWP 2 in the CC 2, a WUS 7 corresponds to a BWP 1 in a CC 3, and a WUS 8 corresponds to a BWP 2 in the CC 3.

If the communications device detects the first wake-up signal, for example, if UE receives the WUS 1, the UE monitors a PDCCH on the BWP 1 in the CC 1 according to a C-DRX configuration of the UE.

It should be noted that the WUS 1 corresponds to the BWP 1 in the CC 1. Therefore, the first mapping relationship may include the correspondence between the first wake-up signal, the at least one component carrier, and the bandwidth part in the at least one component carrier. If the first mapping relationship includes only a correspondence between the first wake-up signal and the bandwidth part, for example, the WUS 1 corresponds to the BWP 1, whether the BWP 1 is a BWP in the active CC 1, the active CC 2, or the CC 3 cannot be distinguished.

It should be understood that the foregoing case is applicable to a case in which a quantity of WUSs configured by the network device for the communications device is not less than a quantity of active CCs of the communications device.

Figure 7:
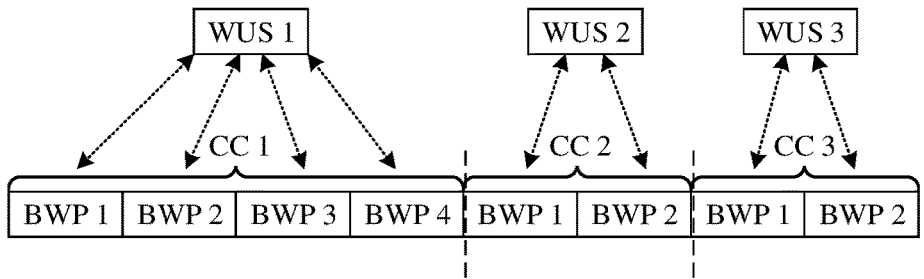
FIG. 7 is a schematic diagram of a correspondence between a wake-up signal (WUS) and a bandwidth part (BWP) according to another embodiment of this application.

For example, the first mapping relationship includes a correspondence between one WUS and a plurality of BWPs. FIG. 7 shows a correspondence between a wake-up signal, an active CC, and an active BWP.

As shown in FIG. 7, one WUS corresponds to a plurality of BWPs. In other words, a WUS 1 may correspond to a BWP 1, a BWP 2, a BWP 3, and a BWP 4 in a CC 1, a WUS 2 corresponds to a BWP 1 and a BWP 2 in a CC 2, and a WUS 3 corresponds to a BWP 1 and a BWP 2 in a CC 3.

If the communications device detects the first wake-up signal, for example, if UE receives the WUS 1, the UE monitors a PDCCH on the BWP 1 to the BWP 4 in the CC 1 according to a C-DRX configuration of the UE.

It should be understood that the foregoing case is applicable to a case in which a quantity of WUSs configured by the network device for the UE is less than a quantity of active BWPs of the UE.

In an example of this application, optionally, when one active component carrier has at least two active bandwidth parts, the first mapping relationship indicates a correspondence between the first wake-up signal and at least one bandwidth part in a set, and the set includes all active bandwidth parts in all active component carriers.

Optionally, each bandwidth part (BWP) in the set has identification information in the set.

It should be understood that each bandwidth part (BWP) in the set has unique identification information in the set. For example, if one set has eight bandwidth parts BWPs, each bandwidth part (BWP) may be any one of a BWP 1 to a BWP 8, and identification information of each BWP is not repeated.

It should be noted that the network device may add the identification information to all the active bandwidth parts in all component carriers based on all the active component carriers. For example, it is assumed that the UE has three active CCs, there are four active BWPs in a CC 1, and there are two active BWPs in each of a CC 2 and a CC 3. In this case, the network device may number all active bandwidth parts as a BWP 1 to a BWP 8.

For example, when one component carrier has at least two active bandwidth parts, the first mapping relationship indicates a correspondence between the first wake-up signal and one bandwidth part in a set, and the set includes all active bandwidth parts in all active component carriers.

Figure 8:
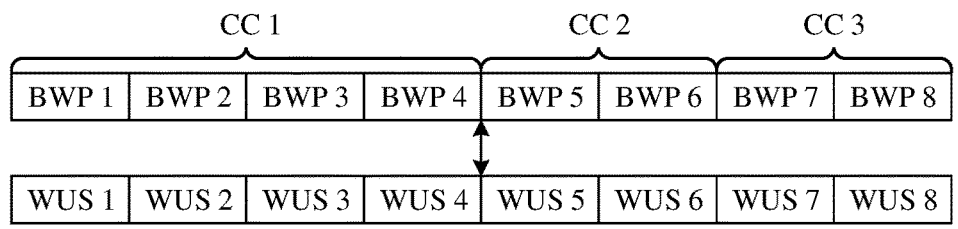
FIG. 8 is a schematic diagram of a correspondence between a wake-up signal (WUS) and a bandwidth part (BWP) according to still another embodiment of this application.

As shown in FIG. 8, one WUS corresponds to one BWP in the set. In other words, a WUS 1 may correspond to a BWP 1 in the set, a WUS 2 corresponds to a BWP 2 in the set, a WUS 3 corresponds to a BWP 3 in the set, a WUS 4 corresponds to a BWP 4 in the set, a WUS 5 corresponds to a BWP 5 in the set, a WUS 6 corresponds to a BWP 6 in the set, a WUS 7 corresponds to a BWP 7 in the set, and a WUS 8 corresponds to a BWP 8 in the set.

If the communications device detects the first wake-up signal, for example, if UE receives the WUS 1, the UE monitors a PDCCH on the BWP 1 according to a C-DRX configuration of the UE.

It should be understood that the foregoing case is applicable to a case in which a quantity of WUSs configured by the network device for the communications device is not less than a quantity of active CCs of the communications device.

For example, when one component carrier has at least two active bandwidth parts, the first mapping relationship indicates a correspondence between the first wake-up signal and a plurality of bandwidth parts in a set, and the set includes all active bandwidth parts in all active component carriers.

Figure 9:
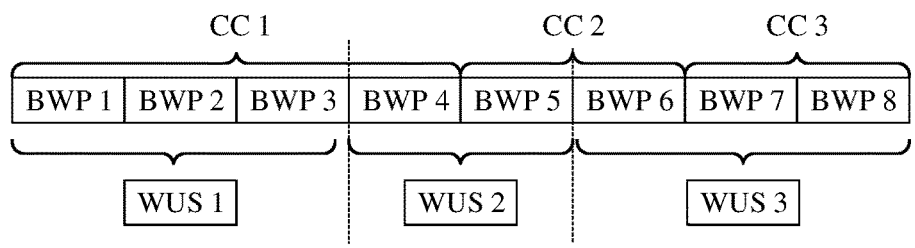
FIG. 9 is a schematic diagram of a correspondence between a wake-up signal (WUS) and a bandwidth part (BWP) according to still another embodiment of this application.

As shown in FIG. 9, one WUS corresponds to a plurality of BWPs in the set. In other words, a WUS 1 may correspond to a BWP 1, a BWP 2, and a BWP 3, a WUS 2 corresponds to a BWP 4 and a BWP 5, and a WUS 3 corresponds to a BWP 6, a BWP 7, and a BWP 8.

If the communications device detects the first wake-up signal, for example, if UE receives the WUS 1, the UE monitors a PDCCH on the BWP 1 to the BWP 3 according to a C-DRX configuration of the UE.

It should be understood that the foregoing case is applicable to a case in which a quantity of WUSs configured by the network device for the UE is less than a quantity of active BWPs of the UE.

Optionally, when one component carrier has at least two active bandwidth parts, the first mapping relationship indicates a correspondence between the first wake-up signal and one group of bandwidth parts in a set, and the set includes all active bandwidth parts in all active component carriers.

Optionally, each bandwidth part (BWP) in the set has identification information in the set.

Figure 10:
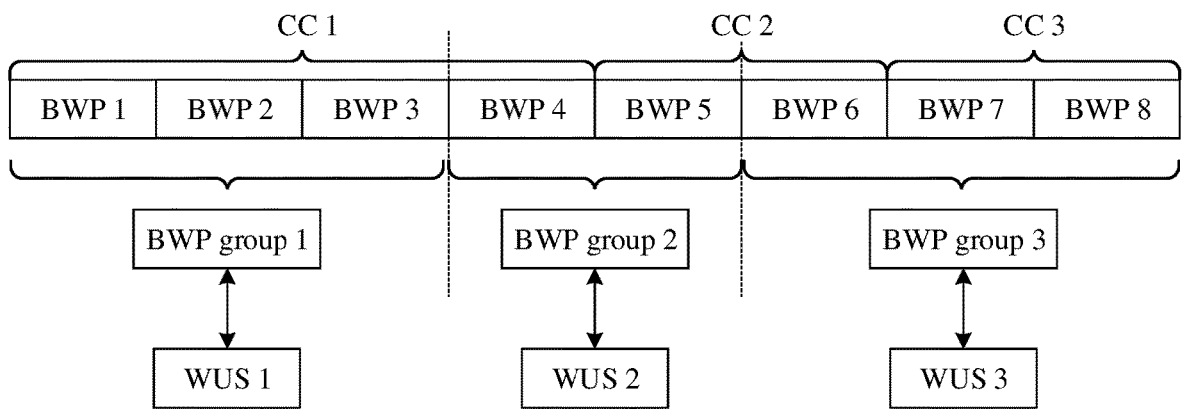
FIG. 10 is a schematic diagram of a correspondence between a wake-up signal (WUS) and a bandwidth part (BWP) according to still another embodiment of this application.

As shown in FIG. 10, one WUS corresponds to one group of BWPs. In other words, a BWP 1, a BWP 2, and a BWP 3 may form a BWP group 1, a BWP 4 and a BWP 5 may form a BWP group 2, and a BWP 6, a BWP 7, and a BWP 8 may form a BWP group 3. A WUS 1 corresponds to the BWP group 1, a WUS 2 corresponds to the BWP group 2, and a WUS 3 corresponds to the BWP group 3.

If the communications device detects the first wake-up signal, for example, if UE receives the WUS 1, the UE monitors a PDCCH on all BWPs in the BWP group 1 according to a C-DRX configuration of the UE.

In a second possible implementation, the mapping relationship configured by the network device is a correspondence between the at least one wake-up signal and the at least one component carrier or bandwidth part.

For example, the network device sends at least one wake-up signal to the communications device, the communications device detects the at least one wake-up signal, and generates a bit group corresponding to the at least one wake-up signal, and the communications device determines, based on the bit group and a second mapping relationship, to monitor a physical downlink control channel on a bandwidth part corresponding to the bit group, where the second mapping relationship indicates a correspondence between the bit group and at least one component carrier or bandwidth part, and the at least one component carrier or bandwidth part is an active component carrier or bandwidth part.

It should be noted that when the communications device detects a plurality of wake-up signals, the communications device may generate, based on the plurality of wake-up signals, bit groups corresponding to the plurality of wake-up signals, and determine, based on the bit groups, to monitor physical downlink control channels of a plurality of bandwidth parts BWP. In other words, the determining, by the communications device based on the at least one wake-up signal, to monitor the at least one physical downlink control channel includes determining, based on the plurality of wake-up signals, to monitor a plurality of physical downlink control channels.

For example, it may be determined, through bit groups corresponding to M wake-up signals, to monitor M physical downlink control channels, where M is a positive integer greater than 1.

For example, it may be determined, through bit groups corresponding to M wake-up signals, to monitor N physical downlink control channels, where N is a positive integer greater than M, and M and N are positive integers greater than 1.

For example, it may be determined, through bit groups corresponding to M wake-up signals, to monitor K physical downlink control channels, where K is a positive integer less than M, and M and K are positive integers greater than 1.

Optionally, when one active component carrier has one active bandwidth part, the second mapping relationship indicates a correspondence between the bit group and at least one component carrier.

For example, a plurality of WUSs correspond to a plurality of CCs/one group of CCs.

If the WUS uses a physical layer signal, different WUSs may be sent by using different time domain resources, frequency domain resources, or code domain resources.

If the WUS uses a MAC CE, a plurality of different bit positions in a corresponding MAC CE may be simultaneously used, where one bit position corresponds to one WUS.

Based on this, the following is an example of a second mapping relationship between a possible value of a bit group formed by three WUSs and a monitored PDCCH, of an active CC combination, that is controlled by the bit group:

| WUS bit group | Active CC ID |
| --- | --- |
| 000 | 1 (CC group 1); |
| 001 | 1 and 2 (CC group 2); |
| ... | ... |
| 111 | 1 to 8 (CC group 8). |

For example, based on the second mapping relationship, if the communications device generates the corresponding bit group 000 based on the detected at least one wake-up signal, the communications device monitors the active component carrier whose identifier is 1, that is, monitors a physical downlink control channel of an active bandwidth part in the component carrier group 1.

It should be understood that the corresponding bit group is generated based on the at least one wake-up signal, and wake-up combinations of various component carriers can be more directly configured.

Optionally, when one component carrier has at least two active bandwidth parts, the second mapping relationship indicates a correspondence between the bit group, at least one component carrier, and a bandwidth part in the at least one component carrier.

For example, a plurality of WUSs correspond to a plurality of BWPs.

If the WUS uses a physical layer signal, different WUSs may be sent by using different time domain resources, frequency domain resources, or code domain resources.

If the WUS uses a MAC CE, a plurality of different bit positions in a corresponding MAC CE may be simultaneously used, where one bit position corresponds to one WUS.

Based on this, the following is an example of a second mapping relationship between a possible value of a bit group formed by three WUSs and a monitored PDCCH, of an active CC/active BWP combination, that is controlled by the bit group:

| WUS bit group | Active CC/BWP ID |
|---|---|
| 000 | $CC_1/BWP_1$; |
| 001 | $CC_1/BWP_1$ and $BWP_2$; |
| ... | ... |
| 111 | $CC_1/BWP_1$ to $BWP_4$ ... $CC_3/BWP_1$ and $BWP_2$. |

For example, based on the second mapping relationship, if the communications device generates the corresponding bit group based on the detected at least one wake-up signal, that is, generates the corresponding bit group 000 through three detected wake-up signals, the communications device monitors a physical downlink control channel of the active BWP 1 whose active component carrier identifier is 1. To be specific, the communications device generates the corresponding bit group through the three detected wake-up signals, to indicate to monitor a physical downlink control channel of one active bandwidth part.

For example, based on the second mapping relationship, if the communications device generates the corresponding bit group based on the detected at least one wake-up signal, that is, generates the corresponding bit group 001 through three detected wake-up signals, the communications device monitors a physical downlink control channel of the active BWP 1 and the active BWP 2 whose active component carrier identifier is 1. To be specific, the communications device generates the corresponding bit group through the three detected wake-up signals, to indicate to monitor a physical downlink control channel of two active bandwidth parts.

For example, based on the second mapping relationship, if the communications device generates the corresponding bit group based on the detected at least one wake-up signal, that is, generates the corresponding bit group 111 through three detected wake-up signals, the communications device monitors a physical downlink control channel of the active CC 1/BWP 1 to 4 and the active CC 3/BWP 1 and 2. To be specific, the communications device generates the corresponding bit group through the three detected wake-up signals, to indicate to monitor a physical downlink control channel of eight active bandwidth parts.

It should be understood that when one active component carrier has at least two active bandwidth parts, the generated bit group not only needs to correspond to the active component carrier, but also needs to correspond to an active bandwidth part in the component carrier.

Optionally, when one component carrier has at least two active bandwidth parts, the second mapping relationship indicates a correspondence between the bit group and each bandwidth part in a set, the set includes all active bandwidth parts in all active component carriers, and each bandwidth part has identification information in the set.

For example, a plurality of WUSs correspond to a plurality of BWPs.

If the WUS uses a physical layer signal, different WUSs may be sent by using different time domain resources, frequency domain resources, or code domain resources.

If the WUS uses a MAC CE, a plurality of different bit positions in a corresponding MAC CE may be simultaneously used, where one bit position corresponds to one WUS.

Based on this, the following is an example of a mapping relationship between a possible value of a bit group formed by three WUSs and a monitored PDCCH, of an active BWP combination, that is controlled by the bit group:

| WUS bit group | Active BWP ID |
|---|---|
| 000 | 1 (BWP group 1); |
| 001 | 1 and 2 (BWP group 2); |
| ... | ... |
| 111 | 1 to 8 (BWP group 8). |

In this embodiment of this application, the network device first determines the WUS. For example, different BWPs in a same CC of same UE, or different CCs of same UE, or different UEs, or different groups of UEs may use different WUSs. Different WUSs may be distinguished through the physical layer or the MAC layer, the physical layer may distinguish different WUSs through different time domain/frequency domain/code domain sending/receiving, and different WUSs through the MAC layer are determined based on different bit positions in the MAC CE.

The network device configures WUSs based on the determined WUS. For example, after the network determines a quantity of WUSs configured for UE, for various possible implementations of controlling, by using the WUS, the UE to monitor a PDCCH on each active BWP of each active CC of the UE, refer to the foregoing mapping relationship between the wake-up signal, the component carrier, and the bandwidth part.

The network device applies the WUS configuration based on the configured WUS. For example, the network device notifies, through RRC signaling, the communications device of a mapping relationship between the WUS, the active CC, and the active BWP of the active CC, so as to control the UE to monitor the PDCCH on an active BWP of each active CC.

For an active BWP, if the UE detects a corresponding WUS based on the foregoing mapping relationship, the UE performs normal PDCCH monitoring in subsequent N on-duration periods. Otherwise, the UE does not need to perform PDCCH monitoring in subsequent M on-duration periods.

Optionally, the method further includes the following.

If the communications device does not monitor a physical downlink control channel of an active bandwidth part in a first component carrier for duration exceeding a preset threshold, the communications device wakes up to monitor the physical downlink control channel of the active bandwidth part in the first component carrier.

Figure 11:
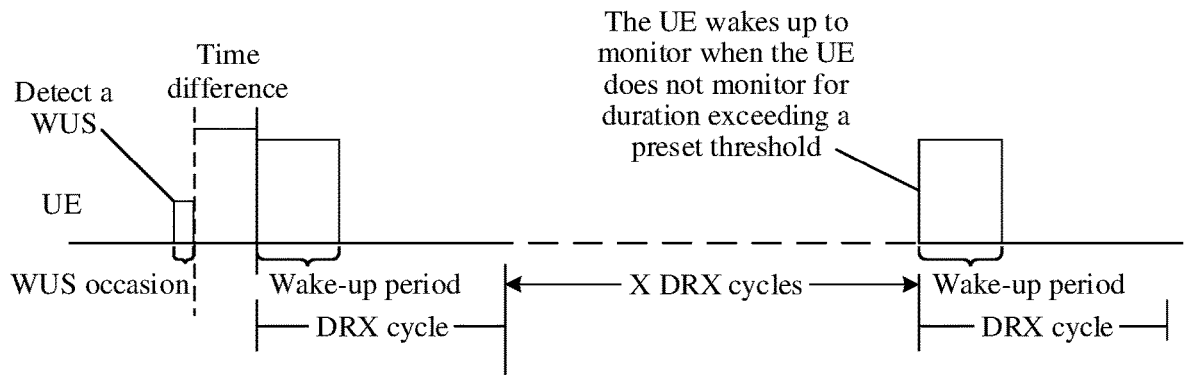
FIG. 11 is a schematic diagram in which a communications device continuously skips monitoring an active bandwidth part (BWP) in a first component carrier according to an embodiment of this application.

For example, as shown in FIG. 11, for an active CC, if the UE does not wake up in X continuous DRX cycles to monitor a PDCCH of any active BWP in the CC, the UE needs to wake up in a next DRX cycle to monitor a PDCCH of any active BWP in the CC, and duration of corresponding on-duration is configurable.

It should be understood that, if the communications device does not monitor any active BWP in an active CC within the preset threshold, in consideration of communication synchronization, the communications device needs to wake up in a next DRX cycle to monitor a PDCCH of any active BWP in the CC. Otherwise, a procedure such as searching needs to be performed for synchronization during next monitoring, and this increases power consumption of the communications device.

Optionally, the method further includes the following.

When the communications device switches from monitoring a physical downlink control channel of a first bandwidth part to sleeping, the communications device switches to an initial bandwidth part or a default bandwidth part.

For example, when the UE switches from monitoring a PDCCH to sleeping in a BWP, the UE switches/falls back to a narrower BWP (for example, the initial or default BWP).

In this embodiment of this application, based on the mapping relationship that is between the WUS and the active bandwidth part (BWP) or the active component carrier and that is configured by the network device for the communications device, a flexible solution in which the WUS controls a behavior of monitoring, by the communications device, the PDCCH on each active CC and each active BWP can be provided. Therefore, power consumption of the communications device is reduced by reducing unnecessary PDCCH monitoring. In addition, a CC wake-up combination requirement expected by the network device/communications device may be further satisfied.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the method for monitoring a physical downlink control channel according to the embodiments of this application. In this application, the communications device flexibly monitors the physical downlink control channel of the active component carrier and the bandwidth part based on the WUS and the mapping relationship that are configured by the network device. Therefore, a physical downlink control channel that does not need to be monitored is reduced, and power consumption of the communications device is reduced. It should be understood that the communications device and the network device in the embodiments of this application may perform the methods in the foregoing embodiments of this application. Therefore, for specific working processes of the following products, reference may be made to corresponding processes in the foregoing method embodiments.

The following describes in detail the communications device and the network device in this application with reference to FIG. 12 to FIG. 18.

Figure 12:
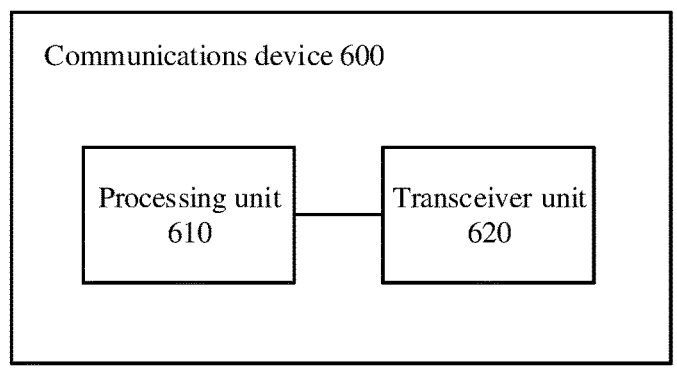
FIG. 12 is a schematic structural diagram of a communications device according to an embodiment of this application.

FIG. 12 is a schematic block diagram of a communications device 600 according to an embodiment of this application. It should be understood that the communications device 600 can perform the steps performed by the communications device in the method in FIG. 5. To avoid repetition, details are not described herein again. The communications device 600 includes a processing unit 610 and a transceiver unit 620.

The transceiver unit 620 is configured to detect at least one wake-up signal.

The processing unit 610 is configured to determine, based on the at least one wake-up signal, to monitor at least one physical downlink control channel, where the at least one physical downlink control channel is a physical downlink control channel of at least one bandwidth part (BWP) indicated by the at least one wake-up signal.

Optionally, the processing unit 610 is specifically configured to determine, based on the at least one wake-up signal and a mapping relationship, to monitor the at least one physical downlink control channel, where the mapping relationship indicates a correspondence between the at least one wake-up signal and the at least one bandwidth part (BWP).

Optionally, the transceiver unit 620 is further configured to obtain the mapping relationship configured by a network device.

Optionally, the at least one wake-up signal includes a first wake-up signal, the mapping relationship includes a first mapping relationship, the first mapping relationship indicates a correspondence between the first wake-up signal and the at least one bandwidth part (BWP), and the processing unit 610 is specifically configured to determine, based on the first wake-up signal and the first mapping relationship, to monitor the at least one physical downlink control channel.

Optionally, when one component carrier has one active bandwidth part (BWP), the first mapping relationship indicates a correspondence between the first wake-up signal and at least one component carrier.

Alternatively, when one active component carrier has at least two active bandwidth parts BWP, the first mapping relationship indicates a correspondence between the first wake-up signal, at least one component carrier, and a bandwidth part (BWP) in the at least one component carrier.

Alternatively, when one active component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

It should be noted that the at least one component carrier is an active component carrier, and the at least one bandwidth part (BWP) is an active bandwidth part (BWP).

Optionally, the mapping relationship includes a second mapping relationship, the second mapping relationship indicates a correspondence between a bit group corresponding to the at least one wake-up signal and the at least one bandwidth part (BWP), and the processing unit 610 is specifically configured to generate the bit group corresponding to the at least one wake-up signal; and determine, based on the bit group and the second mapping relationship, to monitor the at least one physical downlink control channel.

Optionally, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

It should be noted that the at least one component carrier is an active component carrier, and the at least one bandwidth part (BWP) is an active bandwidth part (BWP).

Optionally, the processing unit 610 is further configured to when the communications device switches from monitoring a physical downlink control channel of a first bandwidth part (BWP) to sleeping, switch to an initial bandwidth part or a default bandwidth part.

Optionally, the processing unit 610 is further configured to if the communications device does not monitor a physical downlink control channel of an active bandwidth part (BWP) in a first component carrier for duration exceeding a preset threshold, wake up to monitor the physical downlink control channel of the active bandwidth part in the first component carrier.

Optionally, the at least one wake-up signal is a physical layer signal or a media access control MAC layer signal.

Figure 13:
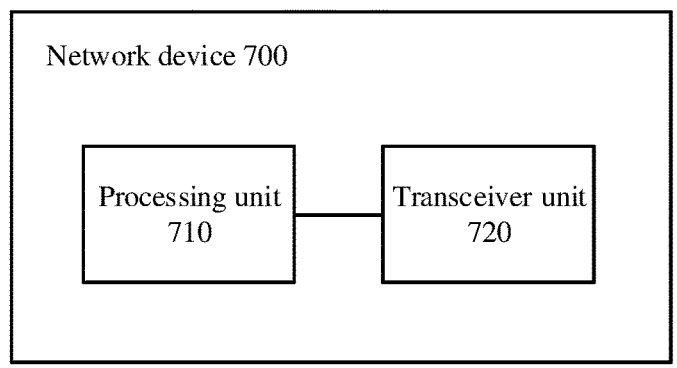
FIG. 13 is a schematic structural diagram of a network device according to an embodiment of this application.

FIG. 13 is a schematic block diagram of a network device 700 according to an embodiment of this application. It should be understood that the network device 700 can perform the steps performed by the network device in FIG. 5. To avoid repetition, details are not described herein again. The network device 700 includes a processing unit 710 and a transceiver unit 720.

The processing unit 710 is configured to determine at least one wake-up signal, where the at least one wake-up signal is used to indicate a communications device to monitor a physical downlink control channel of at least one bandwidth part (BWP).

The transceiver unit 720 is configured to send the at least one wake-up signal to the communications device.

Optionally, the transceiver unit 720 is further configured to send a mapping relationship to the communications device, where the mapping relationship indicates a correspondence between the at least one wake-up signal and the at least one bandwidth part (BWP).

Optionally, when one component carrier has one active bandwidth part (BWP), the first mapping relationship indicates a correspondence between the first wake-up signal and at least one component carrier.

Alternatively, when one component carrier has at least two active bandwidth parts BWP, the first mapping relationship indicates a correspondence between the first wake-up signal, at least one component carrier, and a bandwidth part (BWP) in the at least one component carrier.

Alternatively, when one component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

Optionally, the mapping relationship includes a second mapping relationship, and the second mapping relationship indicates a correspondence between a bit group corresponding to the at least one wake-up signal and the at least one bandwidth part (BWP).

Optionally, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

Optionally, the transceiver unit 720 is specifically configured to send the at least one wake-up signal to the communications device through a physical layer, or send the at least one wake-up signal to the communications device through a media access control MAC layer.

Figure 14:
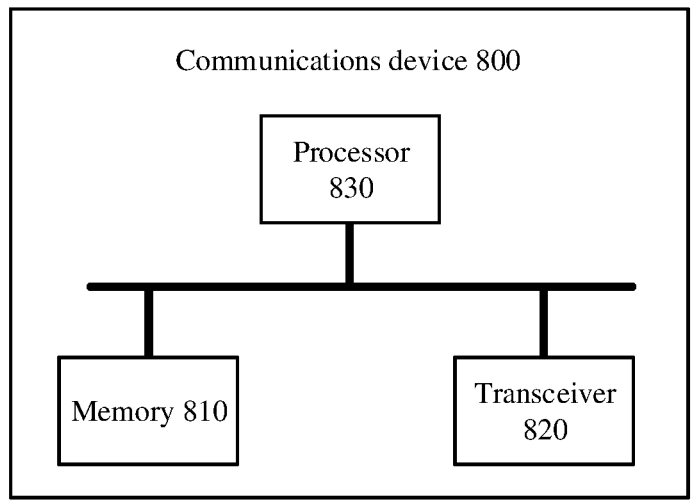
FIG. 14 is another schematic structural diagram of a communications device according to an embodiment of this application.

FIG. 14 is a schematic block diagram of a communications device 800 according to an embodiment of this application. It should be understood that the communications device 800 can perform the steps performed by the communications device in the method in FIG. 5. To avoid repetition, details are not described herein again. The communications device 800 includes a memory 810, configured to store a program, a transceiver 820, configured to communicate with another device, and a processor 830, configured to execute the program in the memory 810, where when the program is executed, the transceiver 820 is configured to detect at least one wake-up signal.

The processor 830 is configured to determine, based on the at least one wake-up signal, to monitor at least one physical downlink control channel, where the at least one physical downlink control channel is a physical downlink control channel of at least one bandwidth part (BWP) indicated by the at least one wake-up signal.

Optionally, the processor 830 is specifically configured to determine, based on the at least one wake-up signal and a mapping relationship, to monitor the at least one physical downlink control channel, where the mapping relationship indicates a correspondence between the at least one wake-up signal and the at least one bandwidth part (BWP).

Optionally, the transceiver 820 is further configured to obtain the mapping relationship configured by a network device.

Optionally, the at least one wake-up signal includes a first wake-up signal, the mapping relationship includes a first mapping relationship, the first mapping relationship indicates a correspondence between the first wake-up signal and the at least one bandwidth part (BWP), and the processor 830 is specifically configured to determine, based on the first wake-up signal and the first mapping relationship, to monitor the at least one physical downlink control channel.

Optionally, when one component carrier has one active bandwidth part (BWP), the first mapping relationship indicates a correspondence between the first wake-up signal and at least one component carrier.

Alternatively, when one active component carrier has at least two active bandwidth parts BWP, the first mapping relationship indicates a correspondence between the first wake-up signal, at least one component carrier, and a bandwidth part (BWP) in the at least one component carrier.

Alternatively, when one active component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

Optionally, the mapping relationship includes a second mapping relationship, the second mapping relationship indicates a correspondence between a bit group corresponding to the at least one wake-up signal and the at least one bandwidth part (BWP), and the processor 830 is specifically configured to generate the bit group corresponding to the at least one wake-up signal, and determine, based on the bit group and the second mapping relationship, to monitor the at least one physical downlink control channel.

Optionally, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

Optionally, the processor 830 is further configured to when the communications device switches from monitoring a physical downlink control channel of a first bandwidth part (BWP) to sleeping, switch to an initial bandwidth part or a default bandwidth part.

Optionally, the processor 830 is further configured to if the communications device does not monitor a physical downlink control channel of an active bandwidth part (BWP) in a first component carrier for duration exceeding a preset threshold, wake up to monitor the physical downlink control channel of the active bandwidth part (BWP) in the first component carrier.

Optionally, the at least one wake-up signal is a physical layer signal or a media access control MAC layer signal.

It should be understood that the communications device shown in FIG. 14 may be a chip, a circuit, or another type of communications device, for example, a chip or a circuit that may be disposed in the communications device. Further, the transceiver may also be interchanged with the transceiver. The transceiver includes a receiver and a transmitter. Still further, the communications device 800 may further include a bus system.

The processor 830, the memory 810, the receiver, and the transmitter are connected to each other through the bus system. The processor 830 is configured to execute an instruction stored in the memory 810, to control the receiver to receive a signal and control the transmitter to send a signal, thereby completing the steps of the communications device in the methods in this application. The receiver and the transmitter may be a same physical entity or different physical entities. When being the same physical entity, the receiver and the transmitter may be collectively referred to as a transceiver. The memory 810 may be integrated into the processor 830, or may be disposed separately from the processor 830.

In an implementation, functions of the receiver and the transmitter may be considered to be implemented through a transceiver circuit or a dedicated transceiver chip. It may be considered that the processor 830 is implemented through a dedicated processing chip, a processing circuit, a processor, or a general-purpose chip.

In another implementation, it may be considered that the communications device provided in this embodiment of this application is implemented by using a general-purpose computer. To be specific, program code for implementing functions of the processor 830, the receiver, and the transmitter are stored in the memory, and a general-purpose processor implements the functions of the processor 830, the receiver, and the transmitter by executing the code in the memory.

Figure 15:
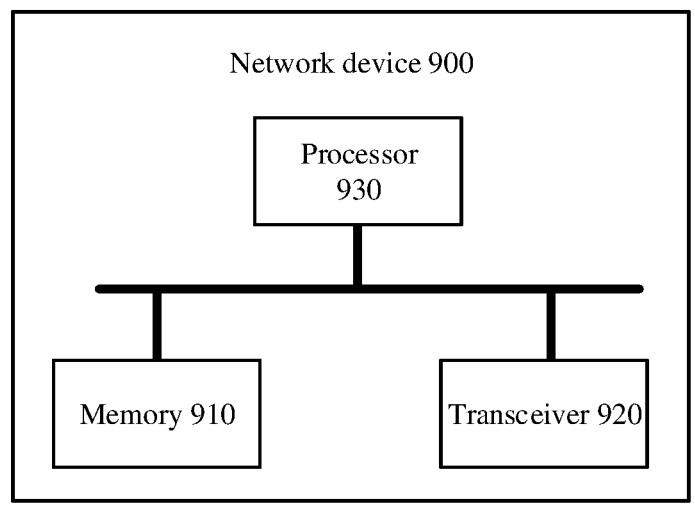
FIG. 15 is another schematic structural diagram of a network device according to an embodiment of this application.

FIG. 15 is a schematic block diagram of a network device 900 according to an embodiment of this application. It should be understood that the network device 900 can perform the steps performed by the network device in the method in FIG. 5. To avoid repetition, details are not described herein again. The network device 900 includes a memory 910, configured to store a program, a transceiver 920, configured to communicate with another device, and a processor 930, configured to execute the program in the memory 910, where when the program is executed, the processor 930 is configured to determine at least one wake-up signal, and the at least one wake-up signal is used to indicate a communications device to monitor a physical downlink control channel of at least one bandwidth part (BWP).

The transceiver 920 is configured to send the at least one wake-up signal to the communications device.

Optionally, the transceiver 920 is further configured to send a mapping relationship to the communications device, where the mapping relationship indicates a correspondence between the at least one wake-up signal and the at least one bandwidth part (BWP).

Optionally, the mapping relationship includes a first mapping relationship, the at least one wake-up signal includes a first wake-up signal, and the first mapping relationship indicates a correspondence between the first wake-up signal and the at least one bandwidth part (BWP).

Optionally, when one component carrier has one active bandwidth part (BWP), the first mapping relationship indicates a correspondence between the first wake-up signal and at least one component carrier.

Alternatively, when one component carrier has at least two active bandwidth parts BWP, the first mapping relationship indicates a correspondence between the first wake-up signal, at least one component carrier, and a bandwidth part (BWP) in the at least one component carrier.

Alternatively, when one component carrier has at least two active bandwidth parts BWP, the first mapping relationship indicates a correspondence between the first wake-up signal and at least one bandwidth part (BWP) in a set, and the set includes all active bandwidth parts BWP in all active component carriers.

It should be noted that the at least one component carrier is an active component carrier, and the at least one bandwidth part (BWP) is an active bandwidth part (BWP).

Optionally, the mapping relationship includes a second mapping relationship, and the second mapping relationship indicates a correspondence between a bit group corresponding to the at least one wake-up signal and the at least one bandwidth part (BWP).

Optionally, when one component carrier has one active bandwidth part (BWP), the second mapping relationship indicates a correspondence between the bit group and at least one component carrier.

Alternatively, when one component carrier has at least two active bandwidth parts BWP, the second mapping relationship indicates a correspondence between the bit group, at least one component carrier, and a bandwidth part (BWP) in the at least one component carrier.

Alternatively, when one component carrier has at least two active bandwidth parts BWP, the second mapping relationship indicates a correspondence between the bit group and at least one bandwidth part (BWP) in a set, and the set includes all active bandwidth parts BWP in all active component carriers.

It should be noted that the at least one component carrier is an active component carrier, and the at least one bandwidth part (BWP) is an active bandwidth part (BWP).

Optionally, the transceiver 920 is further configured to send the at least one wake-up signal to the communications device through a physical layer, or send the at least one wake-up signal to the communications device through a media access control MAC layer.

It should be understood that the network device shown in FIG. 15 may be a chip, a circuit, or another type of network device, for example, a chip or a circuit that may be disposed in the network device. Further, the transceiver may also be interchanged with the transceiver. The transceiver includes a receiver and a transmitter. Still further, the network device 900 may further include a bus system.

The processor 930, the memory 910, the receiver, and the transmitter are connected to each other through the bus system. The processor 930 is configured to execute an instruction stored in the memory 910, to control the receiver to receive a signal and control the transmitter to send a signal, thereby completing the steps of the network device in the methods in this application. The receiver and the transmitter may be a same physical entity or different physical entities. When being the same physical entity, the receiver and the transmitter may be collectively referred to as a transceiver. The memory 910 may be integrated into the processor 930, or may be separated from the processor 930.

In an implementation, functions of the receiver and the transmitter may be considered to be implemented through a transceiver circuit or a dedicated transceiver chip. It may be considered that the processor 930 is implemented through a dedicated processing chip, a processing circuit, a processor, or a general-purpose chip.

In another implementation, it may be considered that the network device provided in this embodiment of this application is implemented by using a general-purpose computer. To be specific, program code for implementing functions of the processor 930, the receiver, and the transmitter are stored in the memory, and a general-purpose processor implements the functions of the processor 930, the receiver, and the transmitter by executing the code in the memory.

An embodiment of this application further provides a communications device, and the communications device may be a terminal device or a circuit. The communications device may be configured to perform an action performed by the communications device in the foregoing method embodiments.

Figure 16:
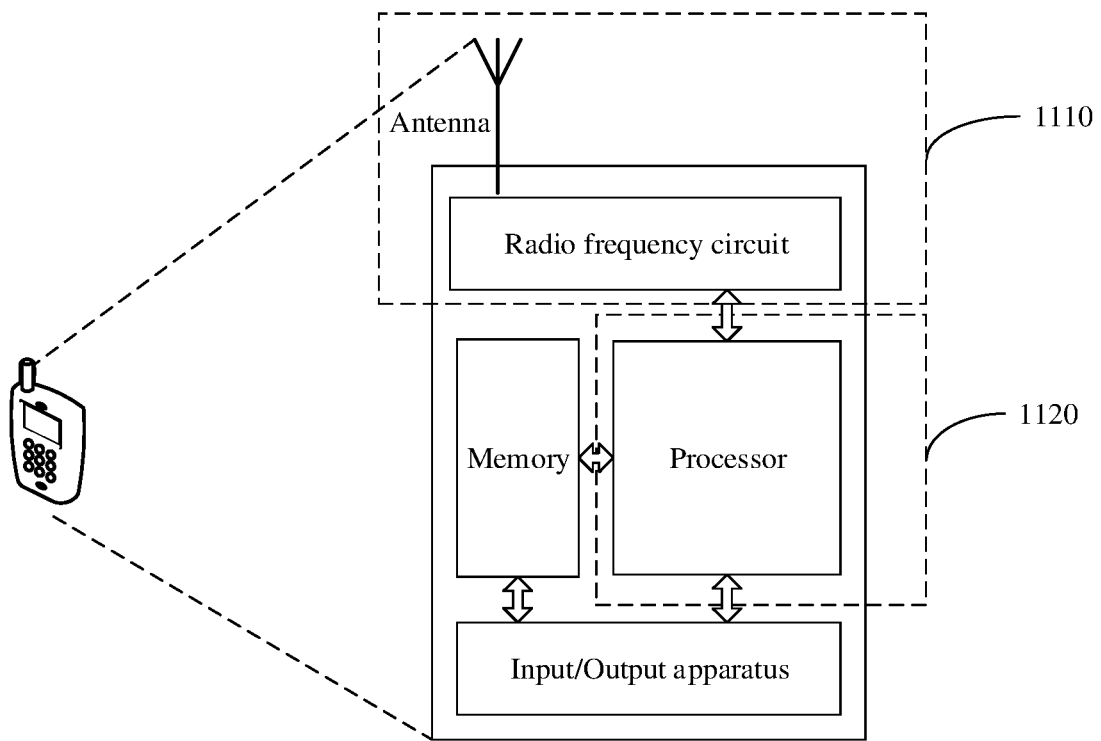
FIG. 16 is a schematic block diagram of a communications device according to an embodiment of this application.

When the communications device is a terminal device, FIG. 16 is a simplified schematic structural diagram of a terminal device. For ease of understanding and convenience of figure illustration, an example in which the terminal device is a mobile phone is used in FIG. 16. As shown in FIG. 16, the terminal device includes a processor, a memory, a radio frequency circuit, an antenna, and an input/output apparatus. The processor is mainly configured to process a communications protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display screen, and a keyboard, is mainly configured to receive data entered by a user and output data to the user. It should be noted that some types of terminal devices may not have the input/output apparatus.

When data needs to be sent, after performing baseband processing on the to-be-sent data, the processor outputs a baseband signal to the radio frequency circuit. After performing radio frequency processing on the baseband signal, the radio frequency circuit sends the radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

For ease of description, only one memory and one processor are shown in FIG. 16. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 16, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit may also be sometimes referred to as a transceiver machine, a transceiver, a transceiver circuit, or the like. The receiving unit may also be sometimes referred to as a receiving machine, a receiver, a receiving circuit, or the like. The sending unit may also be sometimes referred to as a transmitting machine, a transmitter, a transmitting circuit, or the like.

It should be understood that the transceiver unit 1110 is configured to perform a sending operation and a receiving operation on a communications device side in the foregoing method embodiments, and the processing unit 1120 is configured to perform an operation other than the receiving/sending operation of the terminal device in the foregoing method embodiments.

For example, in an implementation, the transceiver unit 1110 is configured to perform the detection operation on the communications device side in step 230 in FIG. 5, and/or the transceiver unit 1110 is further configured to perform another receiving/sending step on the communications device side in the embodiments of this application. The processing unit 1120 is configured to perform step 240 in FIG. 5, and/or the processing unit 1120 is further configured to perform another processing step on the communications device side in the embodiments of this application.

When the communications device is a chip, the chip includes a transceiver unit and a processing unit. The transceiver unit may be an input/output circuit or a transceiver. The processing unit is a processor, a microprocessor, or an integrated circuit integrated on the chip.

Figure 17:
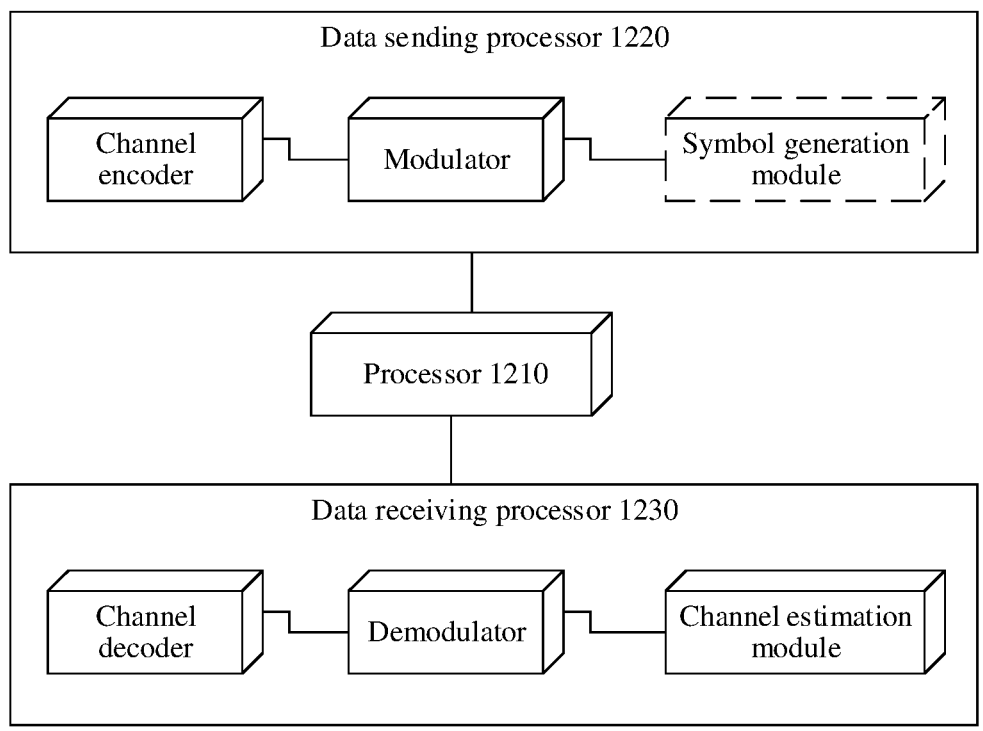
FIG. 17 is another schematic block diagram of a communications device according to an embodiment of this application.

When the communications device in this embodiment of this application is a terminal device, reference may be made to a device shown in FIG. 17. In an example, the device can implement a function similar to that of the processor 830 in FIG. 14. In FIG. 17, the device includes a processor 1210, a data sending processor 1220, and a data receiving processor 1230. The processing unit 610 in the foregoing embodiment may be the processor 1210 in FIG. 17, and completes a corresponding function. The transceiver unit 620 in the foregoing embodiment may be the data sending processor 1220 and/or the data receiving processor 1230 in FIG. 17. Although FIG. 17 shows a channel encoder and a channel decoder, it may be understood that these modules do not constitute a limitation on this embodiment and are merely examples.

Figure 18:
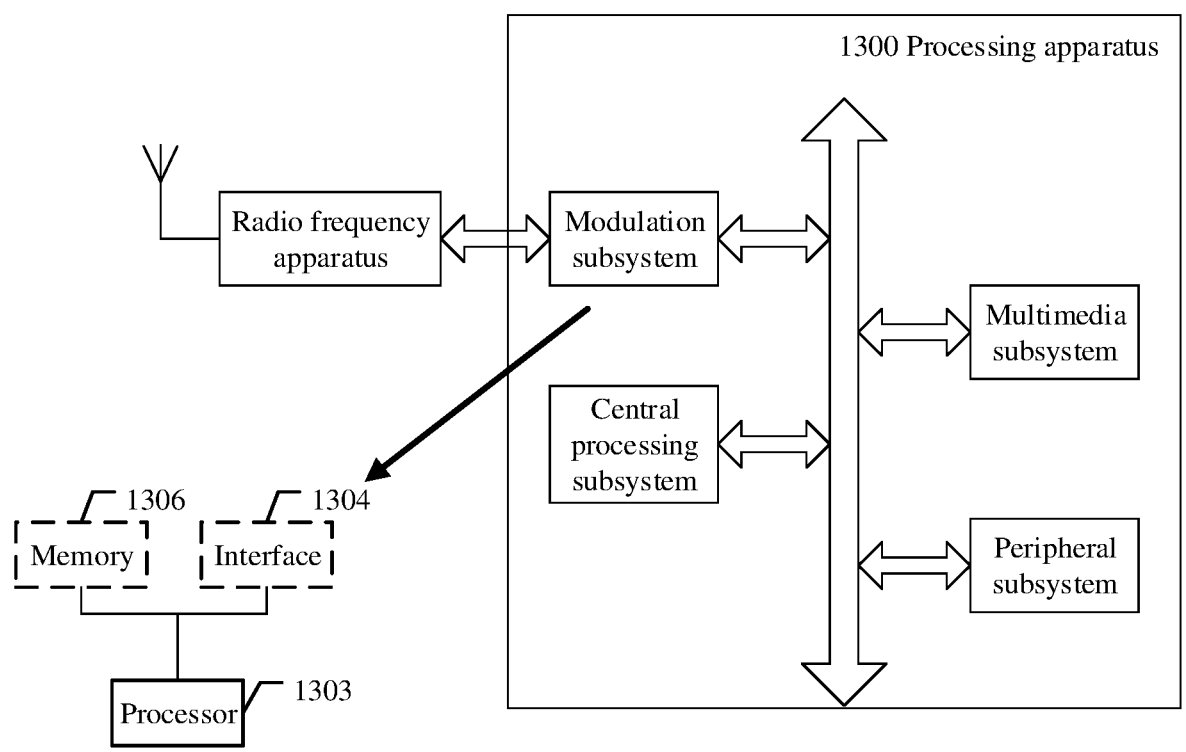
FIG. 18 is still another schematic block diagram of a communications device according to an embodiment of this application.

FIG. 18 shows another form according to an embodiment of this application. A processing apparatus 1300 includes modules such as a modulation subsystem, a central processing subsystem, and a peripheral subsystem. The communications device in this embodiment may be used as the modulation subsystem in the processing apparatus 1300. Specifically, the modulation subsystem may include a processor 1303 and an interface 1304. The processor 1303 completes a function of the processing unit 610, and the interface 1304 completes a function of the transceiver unit 620. In another variation, the modulation subsystem includes a memory 1306, a processor 1303, and a program that is stored in the memory 1306 and that can be run on the processor. When executing the program, the processor 1303 implements the method on the communications device side in the foregoing method embodiments. It should be noted that the memory 1306 may be a nonvolatile memory, or may be a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores an instruction. When the instruction is executed, the method on the communications device side in the foregoing method embodiments is performed.

In another form of this embodiment, a computer program product that includes an instruction is provided. When the instruction is executed, the method on the communications device side in the foregoing method embodiments is performed.

It should be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, the foregoing embodiments may be implemented all or partially in a form of a computer program product. The computer program product includes one or more computer instructions or computer programs. When the program instructions or the computer programs are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application. In addition, functional units in the embodiments of this application may be integrated into one processing unit, or each of the units may exist alone physically, or two or more units are integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   detecting, by a communications device, a wake-up signal; and
   monitoring, by the communications device based on the wake-up signal and a bandwidth part (BWP), a physical downlink control channel, wherein the BWP corresponds to the wake-up signal, and wherein the physical downlink control channel is a physical downlink control channel of the BWP, and
   wherein the wake-up signal corresponds to a component carrier, and wherein the BWP is an active BWP of the component carrier.

2. The method according to claim 1, wherein a bit group corresponds to the wake-up signal and the BWP; and
   wherein the monitoring comprises:
   generating, by the communications device, the bit group corresponding to the wake-up signal and the BWP; and
   monitoring, by the communications device based on the bit group, the wake-up signal, and the BWP, the physical downlink control channel.

3. The method according to claim 2, wherein the bit group corresponds to the component carrier.

4. The method according to claim 1, further comprising:
   switching, by the communications device, to an initial BWP or a default BWP of the component carrier in response to the communications device switching from monitoring a physical downlink control channel of a first BWP of the component carrier to sleeping.

5. The method according to claim 1, further comprising:
   waking up, by the communications device, to monitor a physical downlink control channel of an active BWP in a first component carrier in response to the communications device not monitoring the physical downlink control channel of the active BWP in the first component carrier for a duration exceeding a preset threshold.

6. The method of claim 1, wherein the component carrier is determined based on the wake-up signal.

7. A method comprising:
   determining, by a network device, a wake-up signal; and
   sending, by the network device, the wake-up signal to a communications device, wherein the wake-up signal indicates to the communications device to monitor, based on the wake-up signal and a bandwidth part (BWP), a physical downlink control channel, wherein the BWP corresponds to the wake-up signal, and wherein the physical downlink control channel is a physical downlink control channel of the BWP, and
   wherein the wake-up signal corresponds to a component carrier, and wherein the BWP is an active BWP of the component carrier.

8. The method according to claim 7, wherein a bit group corresponds to the wake-up signal and the BWP.

9. The method according to claim 8, wherein the bit group corresponds to the component carrier.

10. The method according to claim 7, further comprising:
    sending a second wake-up signal corresponding to a second component carrier.

11. A device, comprising:
    at least one processor; and
    a non-transitory computer readable memory storing a program to be executed by the at least one processor, the program including instructions to cause the device to perform operations including:
    detecting a wake-up signal; and
    monitoring, based on the wake-up signal and a bandwidth part (BWP), a physical downlink control channel, wherein the BWP corresponds to the wake-up signal, and wherein the physical downlink control channel is a physical downlink control channel of the BWP, and
    wherein the wake-up signal corresponds to a component carrier, and wherein the BWP is an active BWP of the component carrier.

12. The device according to claim 11, wherein a bit group corresponds to the wake-up signal and the BWP,
    wherein the monitoring comprises:
    generating the bit group corresponding to the wake-up signal and the BWP; and
    monitoring, based on the bit group, the wake-up signal, and the BWP, the physical downlink control channel.

13. The device according to claim 12, wherein the bit group corresponds to the component carrier.

14. The device according to claim 13, the operations further including:
    switching to an initial BWP or a default BWP of the component carrier in response to the device switching from monitoring a physical downlink control channel of a first BWP of the component carrier to sleeping.

15. The device according to claim 11, the operations further including:

waking up to monitor a physical downlink control channel of an active BWP in a first component carrier in response to the device not monitoring the physical downlink control channel of the active BWP in the first component carrier for duration exceeding a preset threshold.

* * * * *